US012686455B2

(12) United States Patent
    Tokita

(10) Patent No.:    US 12,686,455 B2
(45) Date of Patent:        Jul. 21, 2026

(54) AUTOMOTIVE BODY JOINING POSITION OPTIMIZATION ANALYSIS METHOD, DEVICE, AND PROGRAM, AND AUTOMOTIVE BODY MANUFACTURING METHOD

(71) Applicant: JFE STEEL CORPORATION, Tokyo (JP)

(72) Inventor: Yuichi Tokita, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 18/865,588

(22) PCT Filed: Mar. 3, 2023

(86) PCT No.: PCT/JP2023/008052
    § 371 (c)(1),
    (2) Date: Nov. 13, 2024

(87) PCT Pub. No.: WO2023/223629
    PCT Pub. Date: Nov. 23, 2023

(65) Prior Publication Data
    US 2025/0319934 A1      Oct. 16, 2025

(30) Foreign Application Priority Data
    May 20, 2022    (JP) ................................. 2022-082826

(51) Int. Cl.
    B62D 65/02        (2006.01)
    B62D 27/02        (2006.01)
(52) U.S. Cl.
    CPC .......... B62D 65/024 (2013.01); B62D 27/023 (2013.01)

(58) Field of Classification Search
    CPC ...... B62D 65/024; B62D 65/02; B62D 65/00; B62D 27/023; B62D 27/02; B62D 27/00
    See application file for complete search history.

(56) References Cited

U.S. PATENT DOCUMENTS 7,957,918 B2 *   6/2011   Niwa ..................... B21D 22/02
                                                    702/33
8,032,343 B2 *   10/2011  Cai ......................... G06F 30/15
                                                    703/7
(Continued)

FOREIGN PATENT DOCUMENTS

CN        105528480 A      4/2016
CN        109308393 A      2/2019
(Continued)

OTHER PUBLICATIONS

Ertas et al., "Design optimization of spot-welded plates for maximum fatigue life," Finite Elements in Analysis and Design, 2011, vol. 47, pp. 413-423.
(Continued)

*Primary Examiner* — Lawrence Averick
(74) *Attorney, Agent, or Firm* — Oliff PLC

(57)            ABSTRACT
An automotive body joining position optimization analysis method includes: setting all or a part of an automotive body model as an analysis object model; generating an optimization analysis model by setting a candidate for weld line to the analysis object model; setting a variable amplitude load condition; setting the reciprocal of a predetermined target fatigue life as a target liner cumulative damage; setting improvement of the stiffness of the optimization analysis model, a reduction in the liner cumulative damage, which is the reciprocal of a fatigue life of the candidate for weld line, and minimization of the length of the candidate for weld line as optimization analysis conditions; performing optimization analysis by giving the variable amplitude load condition
(Continued)

INITIAL WELD LINE
6540mm
121
120
131
119 118
111
114
112
113   122
116   117
115
:131 to the optimization analysis model, and determining the optimal arrangement of the weld line, which achieves the optimization analysis condition).

4 Claims, 13 Drawing Sheets

(56) References Cited

U.S. PATENT DOCUMENTS

| | | | | |
|---|---|---|---|---|
| 9,145,171 | B2 * | 9/2015 | Kuenkler | B62D 27/02 |
| 10,960,468 | B2 * | 3/2021 | Czinger | B62D 23/005 |
| 11,046,378 | B2 * | 6/2021 | Saito | G01M 17/007 |
| 11,085,473 | B2 * | 8/2021 | Kreig | B22F 10/25 |
| 12,325,466 | B2 * | 6/2025 | Colmont | B62D 21/155 |
| 2009/0119031 | A1 * | 5/2009 | Niwa | G06F 30/23 |
| | | | | 702/170 |
| 2010/0023150 | A1 * | 1/2010 | Cai | B23K 11/11 |
| | | | | 700/103 |
| 2015/0054309 | A1 * | 2/2015 | Kuenkler | B62D 27/02 |
| | | | | 296/187.11 |
| 2018/0085827 | A1 * | 3/2018 | Czinger | B33Y 10/00 |
| 2019/0196447 | A1 * | 6/2019 | Kreig | F16B 11/006 |
| 2020/0039592 | A1 * | 2/2020 | Saito | G06F 30/15 |
| 2023/0161930 | A1 | 5/2023 | Saito | |
| 2023/0169232 | A1 | 6/2023 | Saito | |
| 2023/0281361 | A1 | 9/2023 | Saito | |
| 2023/0347981 | A1 * | 11/2023 | Colmont | B62D 21/155 |

FOREIGN PATENT DOCUMENTS

| | | |
|---|---|---|
| CN | 110287550 A | 9/2019 |
| EP | 2 919 139 A1 | 9/2015 |
| JP | 2013-025593 A | 2/2013 |
| JP | 2016-071770 A | 5/2016 |
| JP | 2021-185443 A | 12/2021 |
| WO | 2021/220543 A1 | 11/2021 |
| WO | 2021/225037 A1 | 11/2021 |

OTHER PUBLICATIONS

Jul. 3, 2025 Exteded Search Report issued in European Patent Application No. 23807247.4.
Apr. 11, 2023 International Search Report issued in International Patent Application No. PCT/JP2023/008052.

* cited by examiner

A: ONE CYCLE OF LOADING CONDITION OF
VIBRATION PATTERN IN FRONT-REAR DIRECTION
B: FIVE CYCLES OF LOADING CONDITION OF
VIBRATION PATTERN IN INWARD/OUTWARD DIRECTION

FIG.10

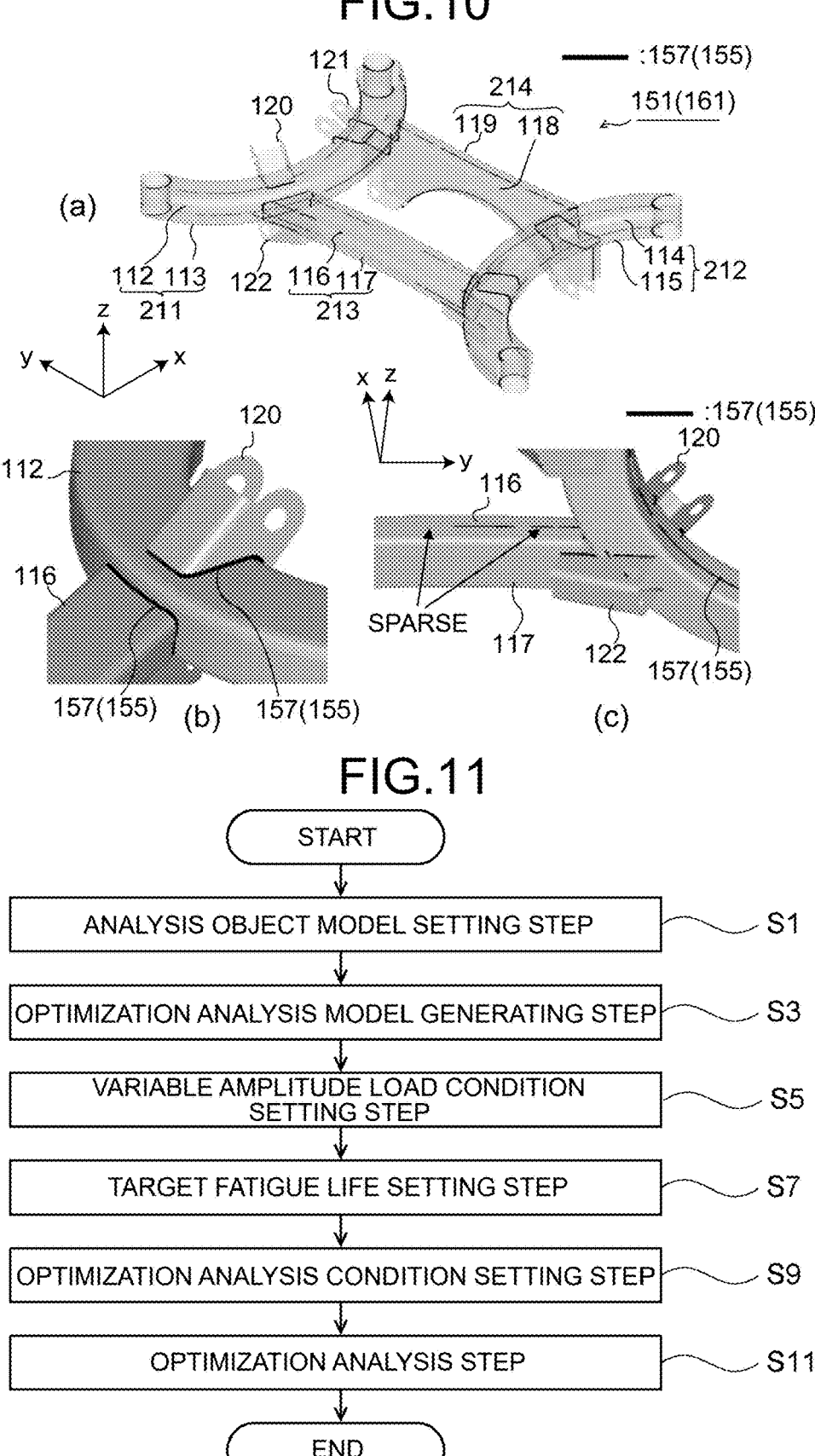

FIG.11

```
              ┌──────────┐
              │  START   │
              └──────────┘
                   │
   ┌──────────────────────────────────────────┐
   │   ANALYSIS OBJECT MODEL SETTING STEP      │───── S1
   └──────────────────────────────────────────┘
                   │
   ┌──────────────────────────────────────────┐
   │ OPTIMIZATION ANALYSIS MODEL GENERATING STEP│──── S3
   └──────────────────────────────────────────┘
                   │
   ┌──────────────────────────────────────────┐
   │     VARIABLE AMPLITUDE LOAD CONDITION     │───── S5
   │              SETTING STEP                 │
   └──────────────────────────────────────────┘
                   │
   ┌──────────────────────────────────────────┐
   │    TARGET FATIGUE LIFE SETTING STEP       │───── S7
   └──────────────────────────────────────────┘
                   │
   ┌──────────────────────────────────────────┐
   │ OPTIMIZATION ANALYSIS CONDITION SETTING STEP│── S9
   └──────────────────────────────────────────┘
                   │
   ┌──────────────────────────────────────────┐
   │        OPTIMIZATION ANALYSIS STEP         │───── S11
   └──────────────────────────────────────────┘
                   │
              ┌──────────┐
              │   END    │
              └──────────┘
```

(a) INPUT IN FRONT-REAR DIRECTION (b) INPUT IN INWARD/OUTWARD DIRECTION

AUTOMOTIVE BODY JOINING POSITION OPTIMIZATION ANALYSIS METHOD, DEVICE, AND PROGRAM, AND AUTOMOTIVE BODY MANUFACTURING METHOD

FIELD

The present invention relates to automotive body joining position optimization analysis method, device and program, and an automotive body manufacturing method. In particular, the present invention relates to automotive body joining position optimization analysis method, device and program, and an automotive body manufacturing method for determining the optimal position of a weld line, which improves the stiffness of an automotive body and a fatigue life near the weld line for bonding and joining a parts assembly in the automotive body.

BACKGROUND

In recent years, weight reduction of an automotive body has been promoted due to environmental problems particularly in the automotive industry. Analysis by computer aided engineering (hereinafter, referred to as "CAE analysis") has been an essential technique for designing the automotive body. It is known that, in the CAE analysis, improvement of stiffness and weight reduction are achieved by using optimization techniques such as mathematical optimization, sheet thickness optimization, shape optimization, and topology optimization.

A structural body such as an automotive body is formed by bonding and joining a plurality of parts by welding and the like as a parts assembly. It is known that an increasing joining amount at a portion where the plurality of parts is bonded and joined as a parts assembly (e.g., increase of number of continuous weld lines by electric arc welding and laser welding) improves the stiffness of the entire automotive body. Improved stiffness inhibits stress generated in the entire part, and tends to improve the fatigue life of the part. Conversely, however, a local stress increase may decrease a fatigue life. Moreover, it is desirable to reduce the joining amount as much as possible from the viewpoint of manufacturing costs of an automotive body. Furthermore, the optimal arrangement of a welding position is required to improve fatigue performance simultaneously under a plurality of input conditions.

Therefore, in order to improve the stiffness and the fatigue life of an automotive body while inhibiting the manufacturing costs of the automotive body, there has been proposed a method of determining a joining position (continuously joined welding position in laser and arc) where parts are bonded and joined together. The method includes a method of determining a joining position through experience, intuition, and the like and a method of increasing the number of joining positions at a portion having large stress by stress analysis. Furthermore, when a plurality of performances is managed, the decision may be made by trial and error, in which a welding position is arranged for satisfying a certain performance and another performance is evaluated and confirmed at the welding position.

In the method of determining a joining position through experience, intuition, and the like, however, a position of a weld line necessary for improving both stiffness and a fatigue life is not determined. For this reason, a position unnecessary for improving stiffness and a fatigue life may be set as a weld line. It must be said that repeating trial and error is inefficient also in terms of costs.

Furthermore, in the method of increasing the number of joining positions at a portion having large stress by stress analysis, stiffness and a fatigue life are changed as compared with those before a joining position is determined by the method while inhibition of deformation of the portion may often increase local stress. For this reason, it cannot necessarily be said that the joining position determined by the method is optimal, and eventually, inefficient trial-and-error design is needed.

In contrast, Patent Literature 1 discloses a method and a device for performing analysis for optimizing a joining position in point joining, such as spot welding, and continuous joining, such as laser welding, electric arc welding, and weld bond joining, which are used for bonding and joining a plurality of parts constituting a structural body model including a two-dimensional element and/or a three-dimensional element. Furthermore, Patent Literature 2 discloses a device and a method of identifying a continuous joining application portion of a structural body model, for easily identifying a portion suitable for continuous joining without requiring complicated work in the structural body model including a two-dimensional element and/or a three-dimensional element constituting a part.

CITATION LIST

Patent Literature

Patent Literature 1: JP 2013-025593 A
Patent Literature 2: JP 2016-71770 A

SUMMARY

Technical Problem

During traveling of an automobile, a variable amplitude load having a temporally inconstant and complicatedly varying amplitude, direction, and the like is input to an automotive body. Therefore, there has been demanded a technique for determining the optimal length and arrangement of a weld line, which can improve the stiffness of the automotive body and a fatigue life near a continuous weld line in a case where a complicated variable amplitude load is input to the automotive body. Many structural bodies for bonding and joining parts together by electric arc welding are used in a chassis component or a suspension part of an automobile. It is, however, known that a fatigue strength around an electric arc welding portion is not improved due to an influence of the notch geometry of a weld toe even a base metal strength of a part is improved. Therefore, in the future, the optimization of electric arc welding joining arrangement will become important amid expectation for expansion of application of high-tensile steel sheets also to chassis components or suspension parts.

The techniques disclosed in Patent Literatures 1 and 2, however, set maximization of a volume ratio of material and stiffness, minimization of displacement, minimization of stress, and the like as analysis conditions for performing optimization calculation, and determines the optimal position of point joining or continuous joining. Improvement of a fatigue life in the point joining or the continuous joining is not considered at all. Furthermore, the technique disclosed in Patent Literature 2 is targeted mainly at an automotive body bonded and joined by spot welding, and identifies a spot joining element having a spot joining interval of a predetermined value or less as a portion suitable for continuous joining. Unfortunately, the technique cannot be applied to a chassis component or a suspension part of an automobile, in which parts are continuously bonded and joined together by electric arc welding and the like.

The present invention is made in view of the above-described problems, and an object thereof is to provide automotive body joining position optimization analysis method, device and program, and an automotive body manufacturing method for determining the optimal arrangement of a weld line, which minimizes the length of the weld line, while improving the stiffness of the automotive body and the fatigue life of a continuous weld line for bonding and joining a parts assembly in the automotive body in a case where a simple or variable load is input to the automotive body.

Solution to Problem

An automotive body joining position optimization analysis method according to a first aspect of the present invention performs optimization analysis for determining optimal arrangement of a weld line to achieve one of: improving stiffness of an automotive body model; improving a fatigue life near the weld line for bonding and joining a parts assembly in the automotive body model; and minimizing a length of the weld line for all or a part of the automotive body model having a plurality of part models including a beam element, a two-dimensional element, and/or a three-dimensional element and having an initial weld line for bonding and joining the plurality of part models as the parts assembly, is executed by a computer and includes: an analysis object model setting step of setting all or a part of the automotive body model as an analysis object model; an optimization analysis model generating step of generating an optimization analysis model in which all candidates for weld line serving as candidates for weld lines in the optimal arrangement are set to the analysis object model; a variable amplitude load condition setting step of setting a variable amplitude load condition in which a variable amplitude load to be given to the optimization analysis model is divided into loading conditions of a plurality of different vibration patterns and a predetermined cycle number of loading conditions of the vibration patterns are combined to form one sequence; a target fatigue life setting step of setting a target fatigue life of the optimization analysis model by a number of sequences of the variable amplitude load condition; an optimization analysis condition setting step of, in order to perform optimization analysis in which the optimization analysis model is set as a target of optimization, determining a number of cycles to fracture near each of the candidates for weld line for each of the loading conditions of the vibration patterns, determining a sum of ratios between the cycle number of the loading conditions of the vibration patterns and the number of cycles to fracture by the number of sequences of the variable amplitude load condition set by the target fatigue life setting unit as a liner cumulative damage of each of the candidates for weld line, and setting a condition regarding the liner cumulative damage of each of the candidates for weld line, which are to be left by optimization analysis, a condition regarding stiffness of the optimization analysis model, and a condition regarding a length of each of the candidates for weld line, which are to be left by optimization analysis, as an objective or a constraint, which is an optimization analysis condition; and an optimization analysis step of giving the variable amplitude load condition set by the variable amplitude load condition setting unit to the optimization analysis model, performing optimization analysis under the optimization analysis condition, and determining arrangement of each of the candidates for weld line as optimal arrangement of the weld line to achieve one of: reducing the liner cumulative damage of each of the candidates for weld line; improving stiffness of the optimization analysis model; and minimizing a length of each of the candidates for weld line, which are to be left.

The optimization analysis step may include performing topology optimization based on densimetry, and performing discretization by setting a penalty coefficient to four or more in the topology optimization.

An automotive body joining position optimization analysis method according to a second aspect of the present invention performs optimization analysis for determining optimal arrangement of a weld line to achieve one of: improving stiffness of an automotive body model; improving a fatigue life near the weld line for bonding and joining a parts assembly in the automotive body model; and minimizing a length of the weld line for all or a part of the automotive body model having a plurality of part models including a beam element, a two-dimensional element, and/or a three-dimensional element and having an initial weld line for bonding and joining the plurality of part models as the parts assembly, is executed by a computer and includes: an analysis object model setting step of setting all or a part of the automotive body model as an analysis object model; an optimization analysis model generating step of generating an optimization analysis model in which all candidates for weld line serving as candidates for weld lines in the optimal arrangement are set to the analysis object model; a variable amplitude load condition setting step of setting a variable amplitude load condition in which a variable amplitude load to be given to the optimization analysis model is divided into loading conditions of a plurality of different vibration patterns and a predetermined cycle number of loading conditions of the vibration patterns are combined to form one sequence; a target fatigue life setting step of setting a target fatigue life of the optimization analysis model by a number of sequences of the variable amplitude load condition; an optimization analysis condition setting step of, in order to perform optimization analysis in which the optimization analysis model is set as a target of optimization, determining a number of cycles to fracture near each of the candidates for weld line for each of the loading conditions of the vibration patterns, determining a sum of ratios between the cycle number of the loading conditions of the vibration patterns and the number of cycles to fracture by the number of sequences of the variable amplitude load condition set by the target fatigue life setting unit as a liner cumulative damage of each of the candidates for weld line, and setting a condition regarding the liner cumulative damage of each of the candidates for weld line, which are to be left by optimization analysis, a condition regarding stiffness of the optimization analysis model, and a condition regarding a length of each of the candidates for weld line, which are to be left by optimization analysis, as an objective or a constraint, which is an optimization analysis condition; an optimization analysis step of giving the variable amplitude load condition set by the variable amplitude load condition setting unit to the optimization analysis model, performing optimization analysis under the optimization analysis condition, and causing arrangement of each of the candidates for weld line to be left as temporary optimal arrangement of the weld line for achieving one of reducing the liner cumulative damage near each of the candidates for weld line, improving stiffness of the optimization analysis model, and minimizing a length of each of the candidates for weld line, which are to be left; a selected candidate-for-weld-line setting analysis object model generating step of generating a selected candidate-for-weld-line setting analysis object model by selecting a candidate for weld line, which has a predetermined length, from the candidates for weld line, which have been left as the temporary optimal arrangement by the optimal analysis, and setting the candidate for weld line, which has been selected as the analysis target model, instead of the initial weld line; a selected candidate-for-weld-line performance calculating step of performing stress analysis by giving a loading condition and a constraint condition of the vibration patterns in the variable amplitude load condition set in the selected candidate-for-weld-line setting analysis object model by the variable amplitude load condition setting unit, and calculating a fatigue life near the candidate for weld line, which has been selected, under the variable amplitude load condition and stiffness of the selected candidate-for-weld-line setting analysis object model by using a result of the stress analysis; a determination step of determining whether or not the fatigue life near the candidate for weld line under the variable amplitude load condition in the selected candidate-for-weld-line setting analysis object model and the stiffness of the selected candidate-for-weld-line setting analysis object model satisfy predetermined performance exceeding the analysis object model in which the initial weld line is set; and an optimal weld line deciding step of deciding arrangement of the candidate for weld line, which has been selected, as optimal arrangement of the weld line, when the determination unit determines that the predetermined performance is satisfied, changing, when the determination unit determines that the predetermined performance is not satisfied, a condition regarding a liner cumulative damage of the candidate for weld line, which is to be left by optimization analysis, set by the optimization analysis condition setting unit, a condition regarding stiffness of the optimization analysis model, or a condition regarding a length of the candidate for weld line, which is to be left by optimization analysis, until the predetermined performance is satisfied, repeating pieces of processing performed by the optimization analysis unit, the selected candidate-for-weld-line setting analysis object model generating unit, the selected candidate-for-weld-line performance calculating unit, and the determination unit, and deciding arrangement of the candidate for weld line, which has been selected at a time when the predetermined performance was satisfied, as optimal arrangement of the weld line.

An automotive body joining position optimization analysis device according to the first aspect of the present invention performs optimization analysis for determining optimal arrangement of a weld line to achieve one of: improving stiffness of an automotive body model; improving a fatigue life near the weld line for bonding and joining a parts assembly in the automotive body model; and minimizing a length of the weld line for all or a part of the automotive body model having a plurality of part models including a beam element, a two-dimensional element, and/or a three-dimensional element and having an initial weld line for bonding and joining the plurality of part models as the parts assembly, and includes: an analysis object model setting unit configured to set all or a part of the automotive body model as an analysis object model; an optimization analysis model generating unit configured to generate an optimization analysis model in which all candidates for weld line serving as candidates for weld lines in the optimal arrangement are set to the analysis object model; a variable amplitude load condition setting unit configured to set a variable amplitude load condition in which a variable amplitude load to be given to the optimization analysis model is divided into loading conditions of a plurality of different vibration patterns and a predetermined cycle number of loading conditions of the vibration patterns are combined to form one sequence; a target fatigue life setting unit configured to set a target fatigue life of the optimization analysis model by a number of sequences of the variable amplitude load condition; an optimization analysis condition setting unit configured to, in order to perform optimization analysis in which the optimization analysis model is set as a target of optimization, determine a number of cycles to fracture near each of the candidates for weld line for each of the loading conditions of the vibration patterns, determine a sum of ratios between the cycle number of the loading conditions of the vibration patterns and the number of cycles to fracture by the number of sequences of the variable amplitude load condition set by the target fatigue life setting unit as a liner cumulative damage of each of the candidates for weld line, and set a condition regarding the liner cumulative damage of each of the candidates for weld line, which are to be left by optimization analysis, a condition regarding stiffness of the optimization analysis model, and a condition regarding a length of each of the candidates for weld line, which are to be left by optimization analysis, as an objective or a constraint, which is an optimization analysis condition; and an optimization analysis unit configured to give the variable amplitude load condition set by the variable amplitude load condition setting unit to the optimization analysis model, perform optimization analysis under the optimization analysis condition, and determine arrangement of each of the candidates for weld line as optimal arrangement of the weld line to achieve one of: reducing the liner cumulative damage of each of the candidates for weld line; improving stiffness of the optimization analysis model; and minimizing a length of each of the candidates for weld line, which are to be left.

The optimization analysis unit may be configured to perform topology optimization based on densimetry, and perform discretization by setting a penalty coefficient to four or more in the topology optimization.

An automotive body joining position optimization analysis device according to the second aspect of the present invention performs optimization analysis for determining optimal arrangement of a weld line to achieve one of: improving stiffness of an automotive body model; improving a fatigue life near the weld line for bonding and joining a parts assembly in the automotive body model; and minimizing a length of the weld line for all or a part of the automotive body model having a plurality of part models including a beam element, a two-dimensional element, and/or a three-dimensional element and having an initial weld line for bonding and joining the plurality of part models as the parts assembly, and includes: an analysis object model setting unit configured to set all or a part of the automotive body model as an analysis object model; an optimization analysis model generating unit configured to generate an optimization analysis model in which all candidates for weld line serving as candidates for weld lines in the optimal arrangement are set to the analysis object model; a variable amplitude load condition setting unit configured to set a variable amplitude load condition in which a variable amplitude load to be given to the optimization analysis model is divided into loading conditions of a plurality of different vibration patterns and a predetermined cycle number of loading conditions of the vibration patterns are combined to form one sequence; a target fatigue life setting unit configured to set a target fatigue life of the optimization analysis model by a number of sequences of the variable amplitude load condition; an optimization analysis condition setting unit configured to, in order to perform optimization analysis in which the optimization analysis model is set as a target of optimization, determine a number of cycles to fracture near each of the candidates for weld line for each of the loading conditions of the vibration patterns, determine a sum of ratios between the cycle number of the loading conditions of the vibration patterns and the number of cycles to fracture by the number of sequences of the variable amplitude load condition set by the target fatigue life setting unit as a liner cumulative damage of each of the candidates for weld line, and set a condition regarding the liner cumulative damage of each of the candidates for weld line, which are to be left by optimization analysis, a condition regarding stiffness of the optimization analysis model, and a condition regarding a length of each of the candidates for weld line, which are to be left by optimization analysis, as an objective or a constraint, which is an optimization analysis condition; an optimization analysis unit configured to give the variable amplitude load condition set by the variable amplitude load condition setting unit to the optimization analysis model, perform optimization analysis under the optimization analysis condition, and cause arrangement of each of the candidates for weld line to be left as temporary optimal arrangement of the weld line for achieving one of reducing the liner cumulative damage near each of the candidates for weld line, improving stiffness of the optimization analysis model, and minimizing a length of each of the candidates for weld line, which are to be left; a selected candidate-for-weld-line setting analysis object model generating unit configured to generate a selected candidate-for-weld-line setting analysis object model by selecting a candidate for weld line, which has a predetermined length, from the candidates for weld line, which have been left as the temporary optimal arrangement by the optimal analysis, and setting the candidate for weld line, which has been selected as the analysis target model, instead of the initial weld line; a selected candidate-for-weld-line performance calculating unit configured to perform stress analysis by giving a loading condition and a constraint condition of the vibration patterns in the variable amplitude load condition set in the selected candidate-for-weld-line setting analysis object model by the variable amplitude load condition setting unit, and calculate a fatigue life near the candidate for weld line, which has been selected, under the variable amplitude load condition and stiffness of the selected candidate-for-weld-line setting analysis object model by using a result of the stress analysis; a determination unit configured to determine whether or not the fatigue life near the candidate for weld line under the variable amplitude load condition in the selected candidate-for-weld-line setting analysis object model and the stiffness of the selected candidate-for-weld-line setting analysis object model satisfy predetermined performance exceeding the analysis object model in which the initial weld line is set; and an optimal weld line deciding unit configured to decide arrangement of the candidate for weld line, which has been selected, as optimal arrangement of the weld line, when the determination unit determines that the predetermined performance is satisfied, change, when the determination unit determines that the predetermined performance is not satisfied, a condition regarding a liner cumulative damage of the candidate for weld line, which is to be left by optimization analysis, set by the optimization analysis condition setting unit, a condition regarding stiffness of the optimization analysis model, or a condition regarding a length of the candidate for weld line, which is to be left by optimization analysis, until the predetermined performance is satisfied, repeat pieces of processing performed by the optimization analysis unit, the selected candidate-for-weld-line setting analysis object model generating unit, the selected candidate-for-weld-line performance calculating unit, and the determination unit, and decide arrangement of the candidate for weld line, which has been selected at a time when the predetermined performance was satisfied, as optimal arrangement of the weld line.

An automotive body joining position optimization analysis program according to the first aspect of the present invention performs optimization analysis for determining optimal arrangement of a weld line to achieve one of: improving stiffness of an automotive body model; improving a fatigue life near the weld line for bonding and joining a parts assembly in the automotive body model; and minimizing a length of the weld line for all or a part of the automotive body model having a plurality of part models including a beam element, a two-dimensional element, and/ or a three-dimensional element and having an initial weld line for bonding and joining the plurality of part models as the parts assembly, and causes a computer to function as: an analysis object model setting unit configured to set all or a part of the automotive body model as an analysis object model; an optimization analysis model generating unit configured to generate an optimization analysis model in which all candidates for weld line serving as candidates for weld lines in the optimal arrangement are set to the analysis object model; a variable amplitude load condition setting unit configured to set a variable amplitude load condition in which a variable amplitude load to be given to the optimization analysis model is divided into loading conditions of a plurality of different vibration patterns and a predetermined cycle number of loading conditions of the vibration patterns are combined to form one sequence; a target fatigue life setting unit configured to set a target fatigue life of the optimization analysis model by a number of sequences of the variable amplitude load condition; an optimization analysis condition setting unit configured to, in order to perform optimization analysis in which the optimization analysis model is set as a target of optimization, determine a number of cycles to fracture near each of the candidates for weld line for each of the loading conditions of the vibration patterns, determine a sum of ratios between the cycle number of the loading conditions of the vibration patterns and the number of cycles to fracture by the number of sequences of the variable amplitude load condition set by the target fatigue life setting unit as a liner cumulative damage of each of the candidates for weld line, and set a condition regarding the liner cumulative damage of each of the candidates for weld line, which are to be left by optimization analysis, a condition regarding stiffness of the optimization analysis model, and a condition regarding a length of each of the candidates for weld line, which are to be left by optimization analysis, as an objective or a constraint, which is an optimization analysis condition; and an optimization analysis unit configured to give the variable amplitude load condition set by the variable amplitude load condition setting unit to the optimization analysis model, perform optimization analysis under the optimization analysis condition, and determine arrangement of each of the candidates for weld line as optimal arrangement of the weld line to achieve one of: reducing the liner cumulative damage of each of the candidates for weld line; improving stiffness of the optimization analysis model; and minimizing a length of each of the candidates for weld line, which are to be left.

The optimization analysis unit may be configured to perform topology optimization based on densimetry, and perform discretization by setting a penalty coefficient to four or more in the topology optimization.

An automotive body joining position optimization analysis program according to the second aspect of the present invention performs optimization analysis for determining optimal arrangement of a weld line to achieve one of: improving stiffness of an automotive body model; improving a fatigue life near the weld line for bonding and joining a parts assembly in the automotive body model; and minimizing a length of the weld line for all or a part of the automotive body model having a plurality of part models including a beam element, a two-dimensional element, and/or a three-dimensional element and having an initial weld line for bonding and joining the plurality of part models as the parts assembly, and causes a computer to function as: an analysis object model setting unit configured to set all or a part of the automotive body model as an analysis object model; an optimization analysis model generating unit configured to generate an optimization analysis model in which all candidates for weld line serving as candidates for weld lines in the optimal arrangement are set to the analysis object model; a variable amplitude load condition setting unit configured to set a variable amplitude load condition in which a variable amplitude load to be given to the optimization analysis model is divided into loading conditions of a plurality of different vibration patterns and a predetermined cycle number of loading conditions of the vibration patterns are combined to form one sequence; a target fatigue life setting unit configured to set a target fatigue life of the optimization analysis model by a number of sequences of the variable amplitude load condition; an optimization analysis condition setting unit configured to, in order to perform optimization analysis in which the optimization analysis model is set as a target of optimization, determine a number of cycles to fracture near each of the candidates for weld line for each of the loading conditions of the vibration patterns, determine a sum of ratios between the cycle number of the loading conditions of the vibration patterns and the number of cycles to fracture by the number of sequences of the variable amplitude load condition set by the target fatigue life setting unit as a liner cumulative damage of each of the candidates for weld line, and set a condition regarding the liner cumulative damage of each of the candidates for weld line, which are to be left by optimization analysis, a condition regarding stiffness of the optimization analysis model, and a condition regarding a length of each of the candidates for weld line, which are to be left by optimization analysis, as an objective or a constraint, which is an optimization analysis condition; an optimization analysis unit configured to give the variable amplitude load condition set by the variable amplitude load condition setting unit to the optimization analysis model, perform optimization analysis under the optimization analysis condition, and cause arrangement of each of the candidates for weld line to be left as temporary optimal arrangement of the weld line for achieving one of reducing the liner cumulative damage near each of the candidates for weld line, improving stiffness of the optimization analysis model, and minimizing a length of each of the candidates for weld line, which are to be left; a selected candidate-for-weld-line setting analysis object model generating unit configured to generate a selected candidate-for-weld-line setting analysis object model by selecting a candidate for weld line, which has a predetermined length, from the candidates for weld line, which have been left as the temporary optimal arrangement by the optimal analysis, and setting the candidate for weld line, which has been selected as the analysis target model, instead of the initial weld line; a selected candidate-for-weld-line performance calculating unit configured to perform stress analysis by giving a loading condition and a constraint condition of the vibration patterns in the variable amplitude load condition set in the selected candidate-for-weld-line setting analysis object model by the variable amplitude load condition setting unit, and calculate a fatigue life near the candidate for weld line, which has been selected, under the variable amplitude load condition and stiffness of the selected candidate-for-weld-line setting analysis object model by using a result of the stress analysis; a determination unit configured to determine whether or not the fatigue life near the candidate for weld line under the variable amplitude load condition in the selected candidate-for-weld-line setting analysis object model and the stiffness of the selected candidate-for-weld-line setting analysis object model satisfy predetermined performance exceeding the analysis object model in which the initial weld line is set; and an optimal weld line deciding unit configured to decide arrangement of the candidate for weld line, which has been selected, as optimal arrangement of the weld line, when the determination unit determines that the predetermined performance is satisfied, change, when the determination unit determines that the predetermined performance is not satisfied, a condition regarding a liner cumulative damage of the candidate for weld line, which is to be left by optimization analysis, set by the optimization analysis condition setting unit, a condition regarding stiffness of the optimization analysis model, or a condition regarding a length of the candidate for weld line, which is to be left by optimization analysis, until the predetermined performance is satisfied, repeat pieces of processing performed by the optimization analysis unit, the selected candidate-for-weld-line setting analysis object model generating unit, the selected candidate-for-weld-line performance calculating unit, and the determination unit, and decide arrangement of the candidate for weld line, which has been selected at a time when the predetermined performance was satisfied, as optimal arrangement of the weld line.

An automotive body manufacturing method according to the present invention, in which a weld line for bonding and joining a parts assembly in an automotive body is optimally arranged and stiffness of the automotive body and a fatigue life of the weld line are improved, includes: determining optimal arrangement of the weld line by using the automotive body joining position optimization analysis method according to the first or the second aspect of the present invention; deciding a joining position of the parts assembly in the automotive body based on the optimal arrangement of the weld line that has been determined; and bonding and joining the parts assembly of the automotive body at the joining position that has been decided.

Advantageous Effects of Invention

In the present invention, optimization analysis for a candidate for weld line is performed by setting all or a part of an automotive body model as an analysis object model, generating an optimization analysis model in which a candidate for weld line, which bonds and joins a parts assembly to the analysis object model, and setting an optimization analysis condition (objective or constraint) regarding the length of a candidate for weld line, which is to be optimized, the fatigue life of the candidate for weld line, the stiffness of the optimization analysis model, and the length of a weld line. This makes it possible to determine the optimal position of a weld line, which can achieve one of minimizing the length of a candidate for weld line, improving the stiffness of an analysis object model, and improving a fatigue life near a weld line for bonding and joining a parts assembly in a case where a temporally inconstant variable amplitude load is input to an automotive body as during traveling of an actual automobile. Furthermore, as a result, a welding position in electric arc welding and the like of an automotive body structure can be optimally arranged. A fatigue life near a weld line can be improved. The stiffness of the automotive body can be improved. Welding costs can be reduced. High stiffness and weight reduction of the automotive body can be achieved.

BRIEF DESCRIPTION OF DRAWINGS

FIG. 9(*b*) illustrates the rear subframe model as viewed from below.

FIG. 10 illustrates an example of the optimal arrangement of a weld line, which has been determined by optimization analysis, in which the rear subframe model is set as an analysis target and an optimization analysis condition regarding stiffness and a fatigue life is set, in the first embodiment and Example 1 of the present invention ((a) perspective view and (b) (c) partially enlarged views).

FIG. 11 is a flowchart illustrating a flow of processing in the automotive body joining position optimization analysis method according to the first embodiment of the present invention.

DESCRIPTION OF EMBODIMENTS

Figure 1:
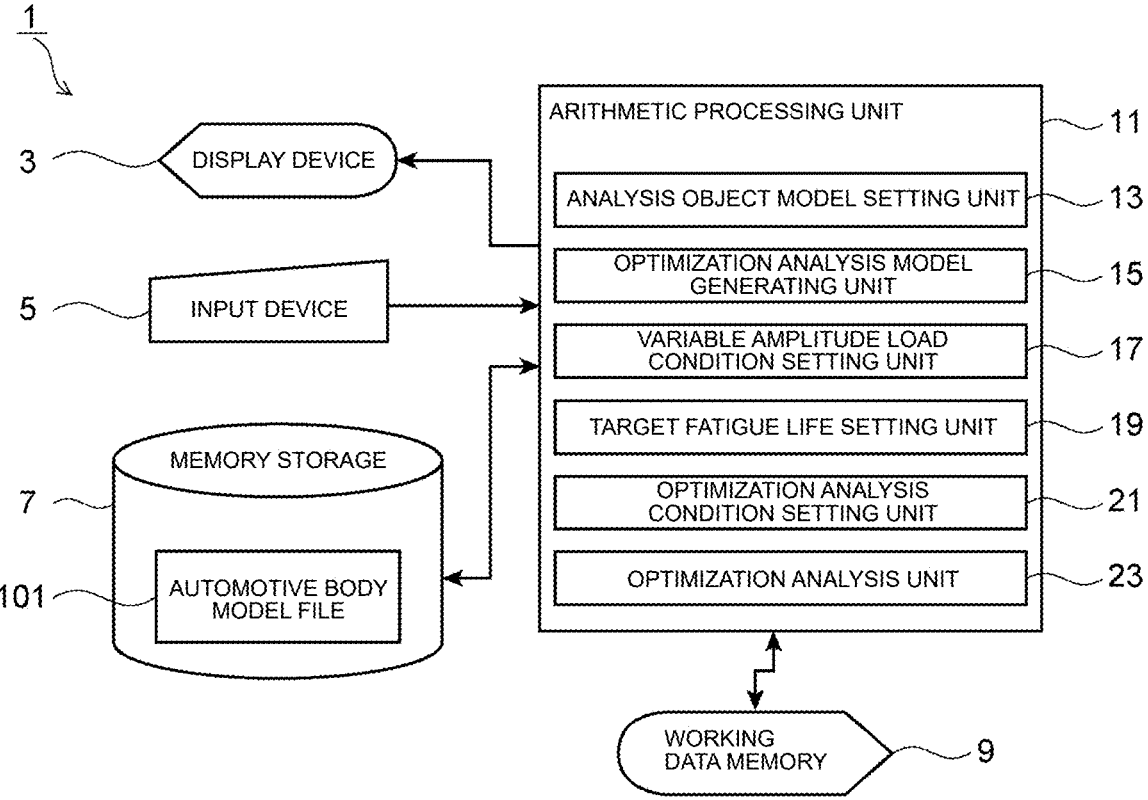
FIG. 1 is a block diagram of a device of performing analysis for optimizing a joining position of an automotive body according to a first embodiment of the present invention.

An automotive body model targeted in the present invention will be described prior to describing automotive body joining position optimization analysis method, device and program according to first and second embodiments of the present invention as well as an automotive body manufacturing method according to a third embodiment. In the specification and the drawings of the present application, an automotive body front-rear direction, an automotive body right-left direction, and an automotive body vertical direction are represented as an X direction, a Y direction, and a Z direction, respectively. In the present specification and the drawings, elements having substantially the same functions and configurations are denoted by the same reference signs to omit redundant description thereof.

<Automotive Body Model and Analysis Object Model>

An automotive body model targeted in the present invention includes a plurality of part models such as body's flame parts and chassis components. These part models are modeled by using beam elements, two-dimensional elements, and/or three-dimensional elements.

In general, the body's flame parts and chassis components are formed mainly of metal sheets having small thicknesses, and the part models constituting the automotive body model may thus include only two-dimensional elements.

Moreover, the automotive body model has an initial weld line for bonding and joining the plurality of part models as a parts assembly. The initial weld line is obtained by modeling a weld line in electric arc welding and laser welding for bonding and joining a plurality of automotive parts as a parts assembly by using a two-dimensional element and a three-dimensional element.

For example, when two part models including a two-dimensional element are bonded and joined by an initial weld line modeled by a two-dimensional element, the two-dimensional element of the initial weld line is coupled to both the two-dimensional elements of the two part models.

Furthermore, when the initial weld line is modeled by a three-dimensional element, the two-dimensional elements of the part models and the three-dimensional element of the initial weld line are coupled by a rigid body element in order to distribute translational force acting on the initial weld line to the part models.

The present invention analyzes deformation caused by a variable amplitude load acting on an analysis object model (to be described later), which is the whole or a part of the automotive body model. Each of the part models of the automotive body model is modeled as an elastic body, a viscoelastic body, or an elastic-plastic body. Then, an automotive body model file 101 (see FIGS. 1 and 12) stores material property and element information of each of the part models constituting the automotive body model and information on an initial weld line and the like in each parts assembly.

First Embodiment

<Automotive Body Joining Position Optimization Analysis Device>

A configuration of an automotive body joining position optimization analysis device (hereinafter, simply referred to as "optimization analysis device") according to the first embodiment of the present invention will be described below.

The optimization analysis device performs optimization analysis in which all or a part of an automotive body model is set as an analysis object model and optimal arrangement of a weld line is determined for achieving one of improving stiffness of the automotive body model, improving a fatigue life of the weld line for bonding and joining a parts assembly in the automotive body model, and minimizing the length of the weld line for the analysis object model.

FIG. 1 illustrates an example of a configuration of an optimization analysis device 1 according to the first embodiment. The optimization analysis device 1 includes a personal computer (PC). As illustrated in FIG. 1, the optimization analysis device 1 includes a display device 3, an input device 5, a memory storage 7, a working data memory 9, and an arithmetic processing unit 11. The display device 3, the input device 5, the memory storage 7, and the working data memory 9 are connected to the arithmetic processing unit 11. The functions thereof are executed by commands from the arithmetic processing unit 11. The function of each of the components of the optimization analysis device 1 according to the first embodiment will be described below.

<<Display Device>>

The display device 3 is used for displaying an automotive body model, an analysis object model, an analysis result, and the like. The display device 3 includes an LCD monitor.

<<Input Device>>

The input device 5 is used for inputting an instruction from an operator, such as instructions to read out the automotive body model file 101 (FIG. 1) and to display the automotive body model and the analysis object model. The input device 5 includes a keyboard and a mouse.

<<Memory Storage>>

The memory storage 7 is used for storing various files such as the automotive body model file 101 (FIG. 1) and analysis results. The memory storage 7 includes a hard disk.

<<Working Data Memory>>

The working data memory 9 is used for temporarily storing data to be used by the arithmetic processing unit 11 and performing an arithmetic operation. The working data memory 9 includes a random access memory (RAM).

<<Arithmetic Processing Unit>>

As illustrated in FIG. 1, the arithmetic processing unit 11 includes an analysis object model setting unit 13, an optimization analysis model generating unit 15, a variable amplitude load condition setting unit 17, a target fatigue life setting unit 19, an optimization analysis condition setting unit 21, and an optimization analysis unit 23. The arithmetic processing unit 11 includes a central processing unit (CPU) such as a PC. Each of these units functions when the CPU executes a predetermined program. The function of each of the units of the arithmetic processing unit 11 will be described below.

(Analysis Object Model Setting Unit)

The analysis object model setting unit 13 acquires an automotive body model from the automotive body model file 101, and sets the whole or a part of the acquired automotive body model as an analysis object model.

An example of processing performed by the analysis object model setting unit 13 will be described below. First, an operator gives an instruction to read out an automotive body model from the automotive body model file 101 through the input device 5. The automotive body model is then read out from the memory storage 7. Next, the automotive body model is displayed on the display device 3 by an instruction from the operator. Then, a portion to be set as a target of optimization analysis in the automotive body model displayed on the display device 3 is designated by an instruction from the operator. The analysis object model setting unit 13 sets the designated portion as an analysis object model.

Figure 2:
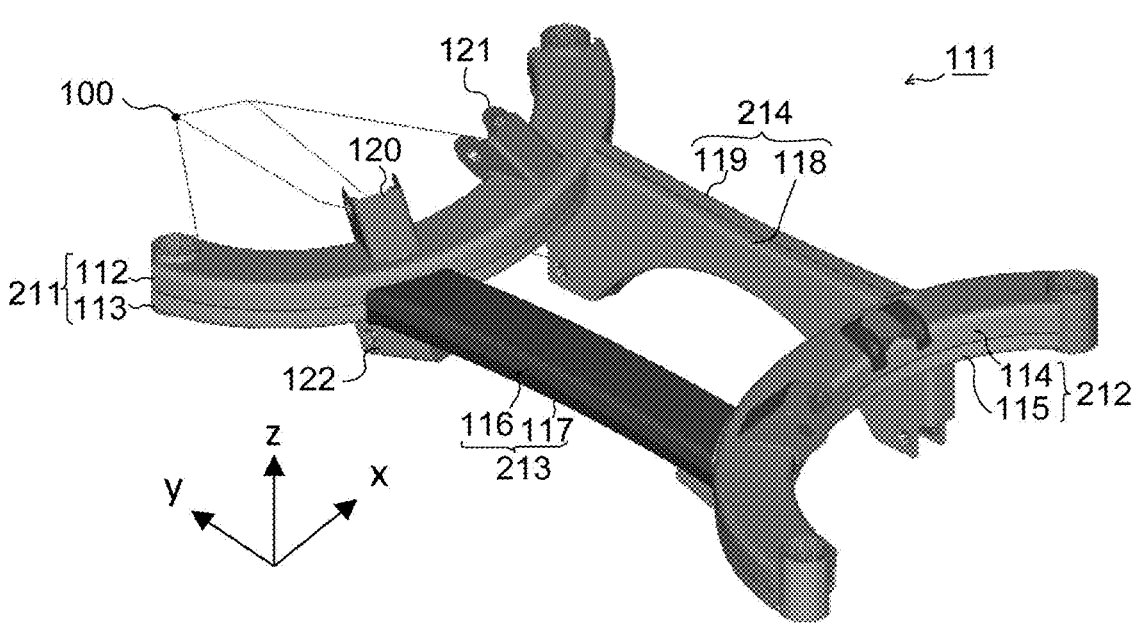
FIG. 2 illustrates a rear subframe model set as an analysis object model in the first embodiment of the present invention.

FIG. 2 illustrates an example in which a rear subframe model 111 is set as a target as an analysis object model. The rear subframe model 111 is obtained by simplifying a rear suspension subframe (hereinafter, rear subframe), which is a chassis component.

In the rear subframe model 111 in FIG. 2, a subframe upper 112 and a subframe lower 113 on the right, which are part models, are bonded and joined by electric arc welding to form a subframe R211. Similarly, a subframe upper 114 and a subframe lower 115 on the left are bonded and joined by electric arc welding to form a subframe L212. A cross member upper 116 and a cross member lower 117 on the front of the automotive body are bonded and joined by electric arc welding to form a cross member front 213. A cross member front 118 and a cross member rear 119 on the rear of the automotive body are bonded and joined by electric arc welding to form a rear cross member 214. The subframe R211, the subframe L212, the cross member front 213, and the rear cross member 214 are further bonded and joined by electric arc welding to form a parallel cross structure. Then, brackets 120, 121, and 122 are bonded and joined by electric arc welding to the parallel cross structure. The brackets 120, 121, and 122 include a part for supporting a suspension and a part for attaching a link mechanism to a tire. (Although FIG. 2 illustrates only the right side, similar brackets are attached on the left side.) Each of these part models is modeled by a two-dimensional element. FIG. 2 illustrates parts connecting a tire input point 100, the brackets 120, 121, and 122, and the rear cross member 214 by using straight lines indicating bar elements in a simplified manner.

Figure 3:
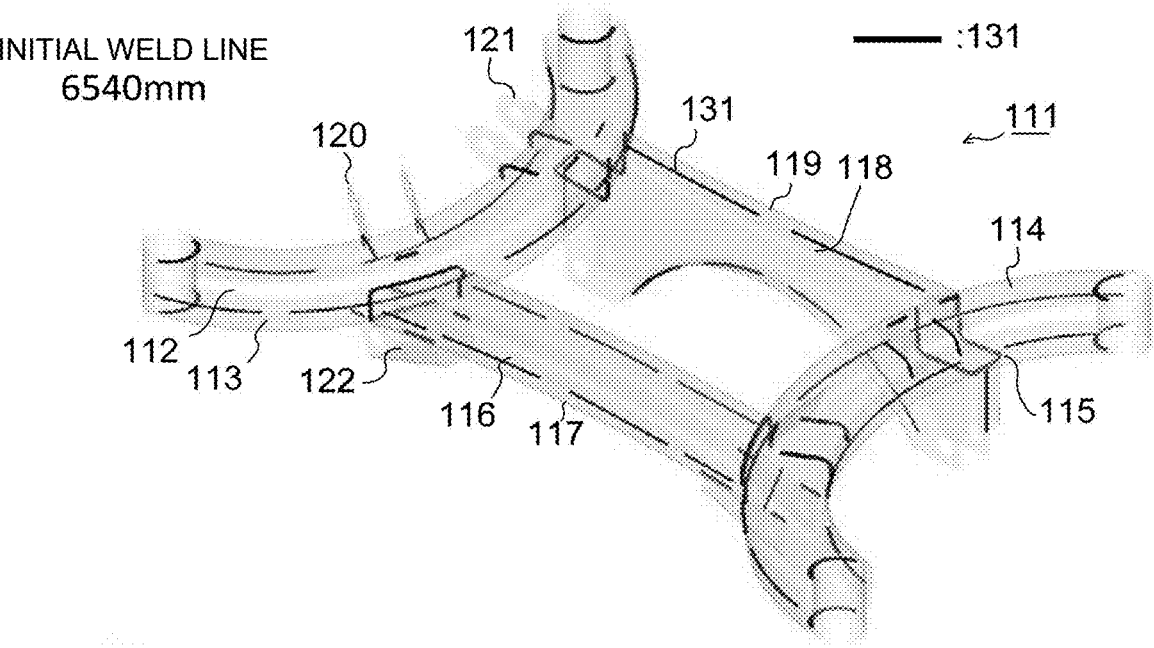
FIG. 3 illustrates an initial weld line preset in the rear subframe model as an example of the analysis object model in the first embodiment of the present invention.
Figure 4:
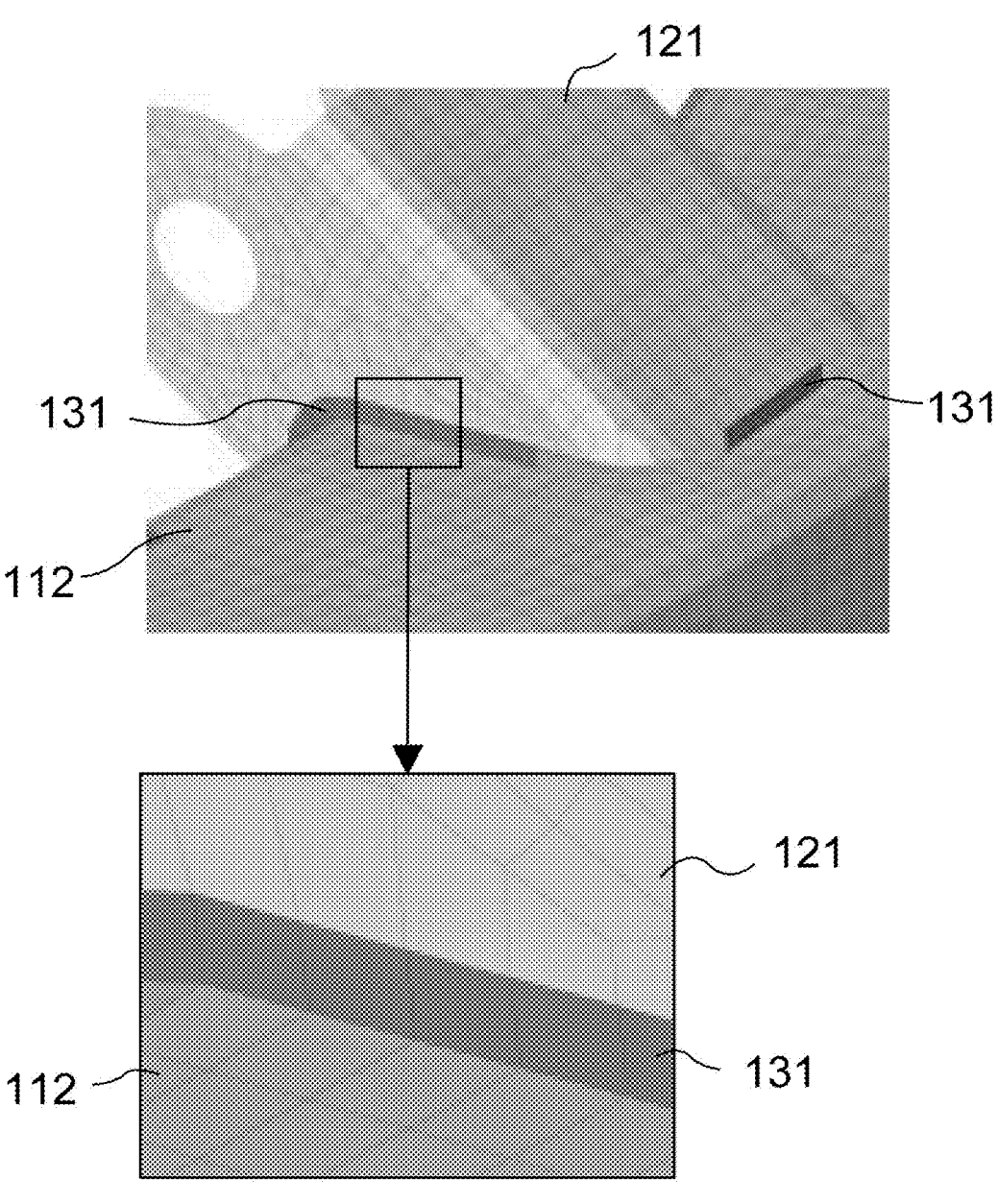
FIG. 4 illustrates an example of an electric arc welding portion obtained by modeling the initial weld line in calculating the fatigue life of the initial weld line in the first embodiment of the present invention.

Then, as illustrated in FIG. 3, an initial weld line 131 for bonding and joining part models as a parts assembly is preset in the rear subframe model 111. As illustrated in FIG. 4, the initial weld line 131 is modeled by two-dimensional elements coupled to two-dimensional elements of part models by node sharing, and has a length of 6540 mm. The initial weld line 131 has a smaller sheet thickness of sheet thicknesses of part models to be bonded and joined. Moreover, the initial weld line 131 has a material property value similar to that of a part model.

Figure 5:
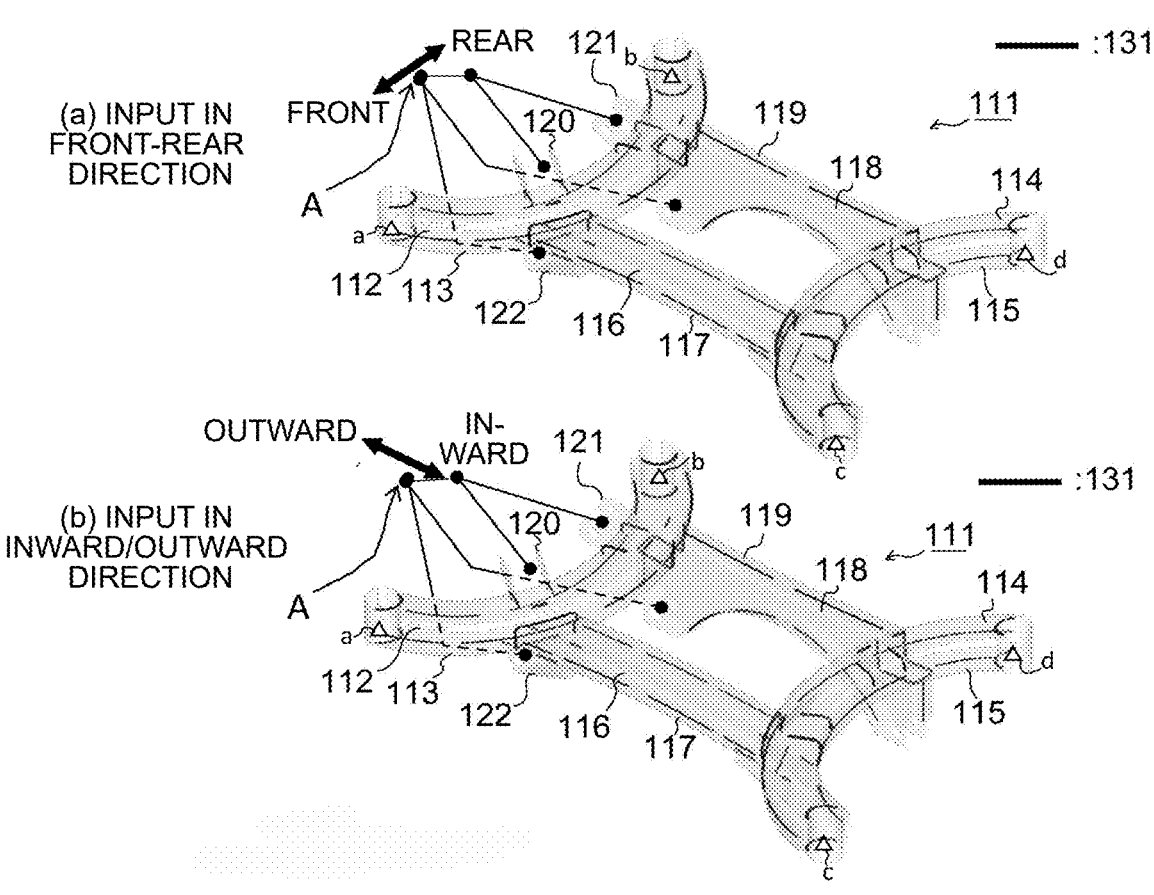
FIG. 5 illustrates an example of a loading condition and a constraint condition of a first vibration pattern and a second vibration pattern given to the rear subframe model set as an analysis object model in the first embodiment of the present invention.

Furthermore, in order for the variable amplitude load condition setting unit 17 to be described later to set a variable amplitude load condition and a constraint condition to be given to the rear subframe model 111, the brackets 120, 121, and 122, the rear cross member 214, and the tire input point 100 (see FIG. 2) are coupled by bar elements as illustrated in FIG. 5. The tire input point 100 is set as a load input point A. Four points of mount bushings a, b, c, and d in the figure are set as complete restraint points.

(Optimization Analysis Model Generating Unit)

Figure 6:
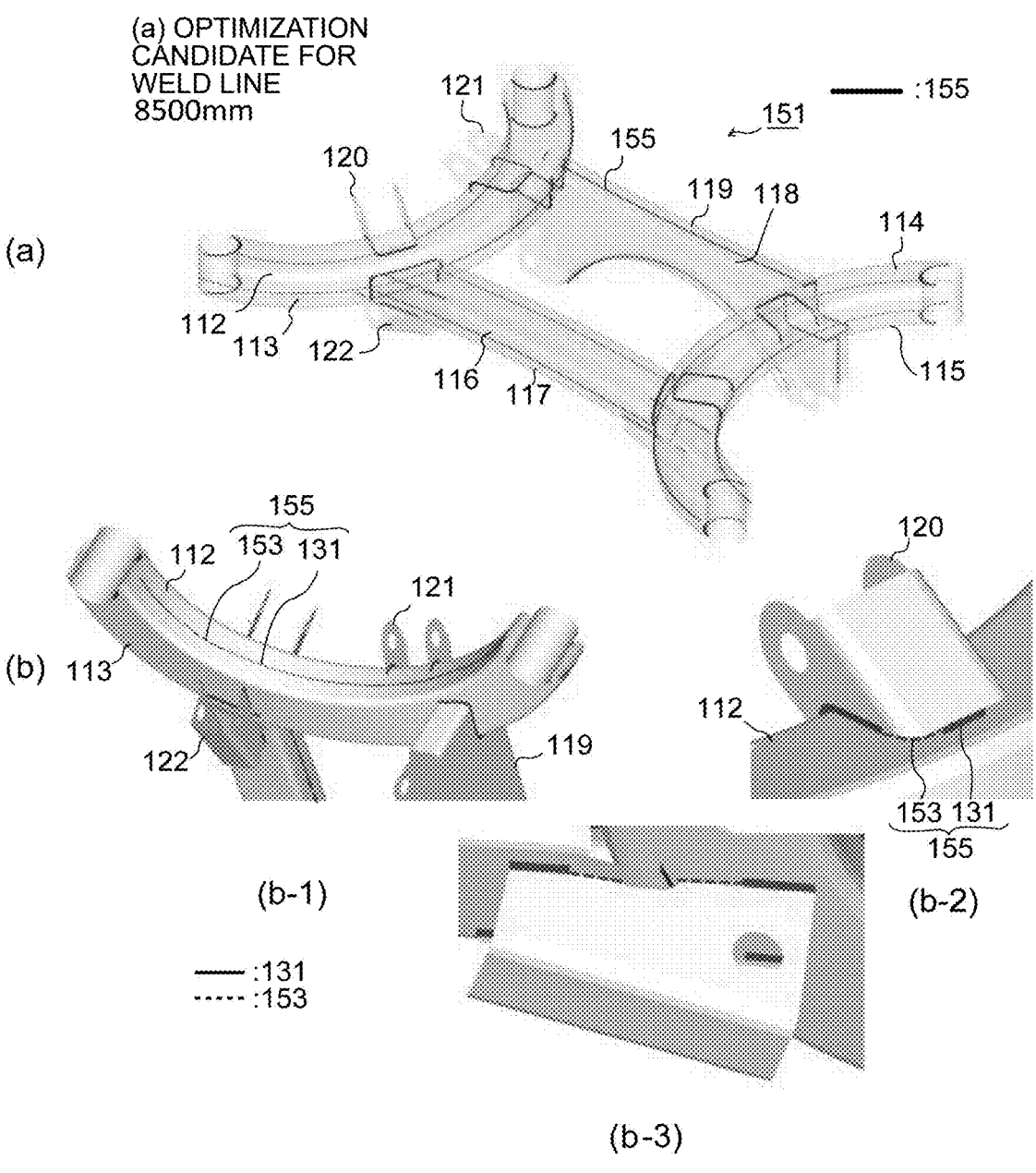
FIG. 6 illustrates an example of an optimization analysis model in which an initial weld line preset in the analysis object model and an additional weld line added to the analysis object model are set as candidates for weld line in the first embodiment of the present invention ((a) entire optimization analysis model and (b) partially enlarged view of optimization analysis model).

As illustrated in FIG. 6, the optimization analysis model generating unit 15 generates an optimization analysis model 151 in which all candidates for weld line, serving as candidates for weld lines in optimal arrangement, that is, a maximum settable number of candidates for weld line are set to the analysis object model.

FIG. 6 illustrates the optimization analysis model 151 generated by setting a candidate 155 for weld line in the rear subframe model 111. FIG. 6(b) illustrates a part of the optimization analysis model 151 in an enlarged manner. A solid line indicates the initial weld line 131. A broken line indicates an additional weld line 153. Then, FIG. 6(a) illustrates the initial weld line 131 and the additional weld line 153 as the candidate 155 for weld line. The additional weld line 153 may be added so as to connect intermittently set initial weld lines 131. The additional weld line 153 may be set by extending an end of an initial weld line 131. Alternatively, when there is no space for setting the additional weld line 153, a part shape may be changed to set the additional weld line 153. Similarly to the above-described initial weld line 131, the additional weld line 153 may be modeled by a two-dimensional element or a three-dimensional element.

(Variable Amplitude Load Condition Setting Unit)

The variable amplitude load condition setting unit 17 sets a variable amplitude load condition in which a variable amplitude load to be given to the optimization analysis model is divided into loading conditions of a plurality of different vibration patterns and a predetermined cycle number of loading conditions of the vibration patterns are combined to form one sequence.

The variable amplitude load is obtained by dividing a load to be input to the analysis object model into vibration patterns in which one or a plurality of a magnitude, a position, and a direction is different from each other and combining a predetermined cycle number of vibration patterns, and obtained by simulating a temporally varying variable amplitude load input to an automotive body at the time when an actual automobile travels. Then, the variable amplitude load condition is given in calculating fatigue lives to be described later of the initial weld line 131 and a candidate for weld line.

The variable amplitude load condition setting unit 17 may set a variable amplitude load condition and a constraint condition. The variable amplitude load condition is obtained by dividing a variable amplitude load into loads of a plurality of different vibration patterns and combining these loads. The constraint condition constrains an analysis object model for each variable amplitude load condition.

In the first embodiment, the variable amplitude load condition includes a loading condition of a first vibration pattern and a condition of a second vibration pattern with the mount bushings a to d to be attached to the automotive body being completely restrained and the tire input point 100 on the right of the automotive body being set as the load input point A in the rear subframe model 111. In the loading condition of the first vibration pattern, a variable amplitude load of ±2.5 kN is input in the front-rear direction (Input 1) as illustrated in FIG. 5(a). In the condition of the second vibration pattern, a variable amplitude load of +6.0 kN is input in an inward/outward direction (Input 2) as illustrated in FIG. 5(b).

Figure 7:
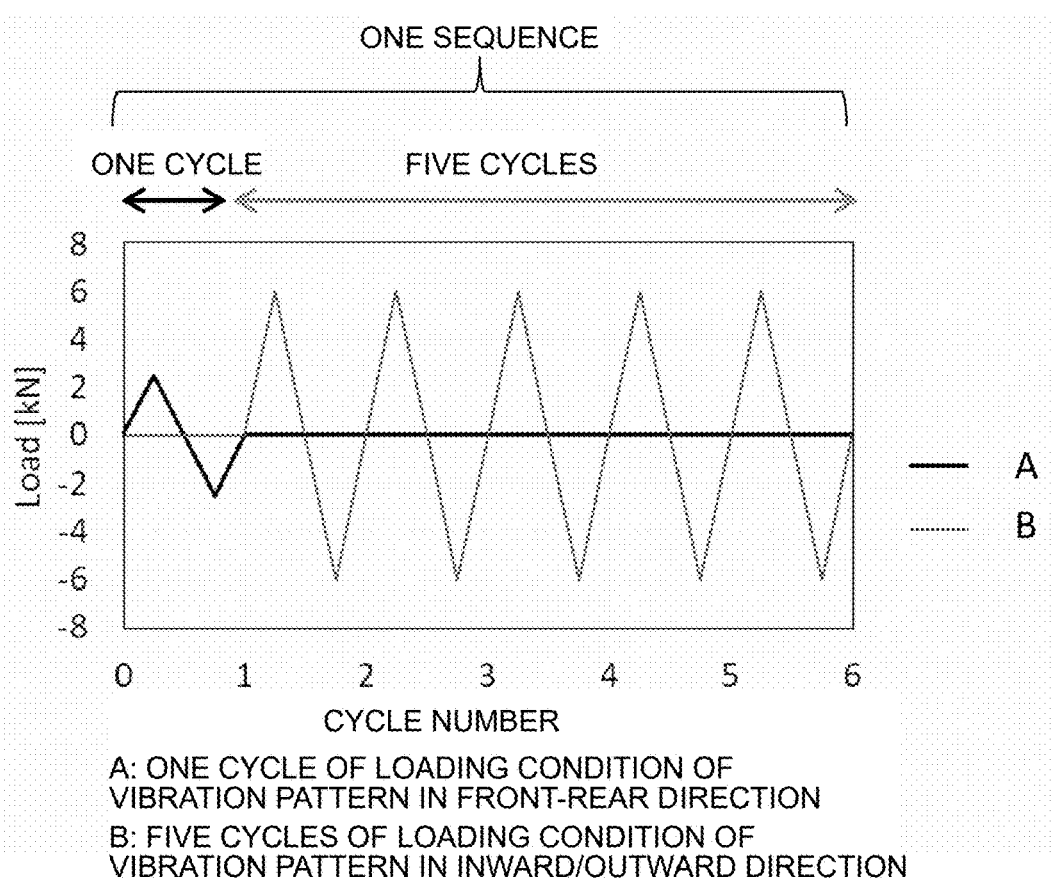
FIG. 7 illustrates an example of a variable amplitude load condition set in the first embodiment of the present invention.

Then, as illustrated in a schematic diagram of a variable amplitude load history of FIG. 7, one cycle of a loading condition of the first vibration pattern and five cycles of a loading condition of the second vibration pattern are combined to form a variable amplitude load condition of one sequence. Then, a fatigue life under a variable condition to be loaded will be considered. FIG. 7 is a graph schematically illustrating a reversed variable amplitude load with the magnitude of a load set as an amplitude under each of the loading condition of the first vibration pattern and the loading condition of the second vibration pattern for indicating a cycle number of each of the loading condition of the first vibration pattern and the loading condition of the second vibration pattern in the variable amplitude load condition of one sequence.

(Target Fatigue Life Setting Unit)

The target fatigue life setting unit 19 sets a target fatigue life of the optimization analysis model 151 based on the number of sequences of the variable amplitude load condition.

The target fatigue life of the optimization analysis model 151 is set by separately performing stress analysis by giving a loading condition of a vibration pattern under the variable amplitude load condition set by the variable amplitude load condition setting unit 17 to the analysis object model, calculating a fatigue life by using commercially available fatigue life predicting software, and referring to the shortest fatigue life. Furthermore, the predetermined number of sequences may be set as the target fatigue life of the optimization analysis model 151 from a conventional empirical rule.

In general, a load input to an actual automotive body is not temporally constant, the initial weld line 131 can be regarded as being in a stress state in which stresses having various amplitudes are randomly generated. A linear cumulative damage rule is used for evaluating the fatigue life of the initial weld line 131 in such a stress state.

Figure 8:
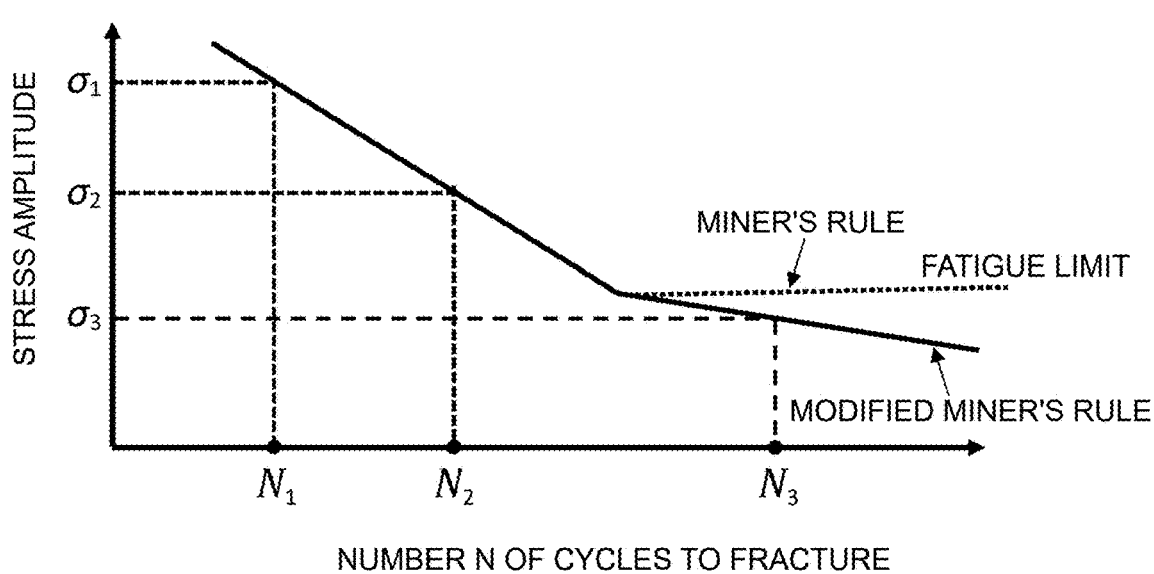
FIG. 8 is a stress endurance diagram (S-N diagram) used for calculating a fatigue life under the variable amplitude load condition in the first embodiment.

In the linear cumulative damage rule, first, a state in which stresses having various amplitudes are randomly generated is considered as a state in which stresses having different amplitudes such as $\sigma_1$, $\sigma_2$, $\sigma_3$, ..., and $\sigma_m$ are independently repeated. Next, assuming that each of stress amplitudes $\sigma_1$, $\sigma_2$, $\sigma_3$, ... and $\sigma_m$ is independently generated, the numbers $N_1$, $N_2$, $N_3$, ..., and $N_m$ of cycles to fracture (fatigue fracture) at each stress amplitude are read from an S-N diagram as illustrated in FIG. 8. Damage degrees in a case where each of the stress amplitudes is repeated by $n_1$, $n_2$, $n_3$, ..., and $n_m$ are considered as $n_1/N_1$, $n_2/N_2$, $n_3/N_3$, ..., and $n_m/N_m$.

In the linear cumulative damage rule, as indicated in Expression (1), a liner cumulative damage dm is determined. The liner cumulative damage is the sum of damage degrees at individual stress amplitudes. Then, when the liner cumulative damage dm≥1 is established, fatigue fracture occurs. In a variable amplitude load condition under which an irregular cyclic variable amplitude load is received, each of the stress amplitudes $\sigma_1$, $\sigma_2$, $\sigma_3$, . . . , and $\sigma_m$ and the numbers $n_1$, $n_2$, $n_3$, . . . , and $n_m$ of cycles may be decided by using a rainflow counting method.

$$dm = \sum_{i=1}^{m} \frac{n_i}{N_i} = \frac{n_1}{N_1} + \frac{n_2}{N_2} + \frac{n_3}{N_3} + \ldots + \frac{n_m}{N_m} \quad (1)$$

A specific procedure of the target fatigue life setting unit 19 calculating a target liner cumulative damage of the initial weld line 131 under the variable amplitude load condition is as follows.

First, stresses acting on the initial weld line 131 determined by performing stress analyses for loading conditions of vibration patterns in the variable amplitude load condition are set as different stress amplitudes $\sigma_1$, $\sigma_2$, $\sigma_3$, . . . , and $\sigma_m$ generated in the initial weld line 131 under the variable amplitude load condition.

Next, the target fatigue life setting unit 19 determines, from the S-N diagram (FIG. 8), the numbers $N_1$, $N_2$, $N_3$, . . . , and $N_m$ of cycles to fracture of the initial weld line 131 in a case where each stress amplitude is independently generated in the initial weld line 131.

Subsequently, the numbers $N_1$, $N_2$, $N_3$, . . . , and $N_m$ of cycles to fracture at each stress amplitude and cycle numbers $n_1$, $n_2$, $n_3$, . . . , and $n_m$ of a loading condition of each vibration pattern in one sequence of the variable amplitude load condition are substituted into Expression (1) to calculate the liner cumulative damage dm in one sequence. Moreover, a liner cumulative damage DM in a case where one sequence of the variable amplitude load condition is continuously repeated K times (K sequences) is calculated by Expression (2). Then, the number K of sequences in a case of the liner cumulative damage DM of one or more is calculated as the fatigue life of the initial weld line 131 under the variable amplitude load condition.

$$DM = \sum_{j=1}^{K} \sum_{i=1}^{m} \frac{n_i}{N_i} = \sum_{j=1}^{K} \left( \frac{n_1}{N_1} + \frac{n_2}{N_2} + \frac{n_3}{N_3} + \ldots + \frac{n_m}{N_m} \right) \quad (2)$$

The target fatigue life setting unit 19 sets the target fatigue life of the optimization analysis model 151 based on the fatigue life of the initial weld line 131 calculated as described above. The candidate 155 for weld line (to be described later), which is to be left by optimization analysis is to satisfy the target fatigue life. In the first embodiment, the target fatigue life is at least equal to or longer than the shortest fatigue life (minimum fatigue life) of those of the initial weld lines 131 calculated by the target fatigue life setting unit 19.

Figure 9:
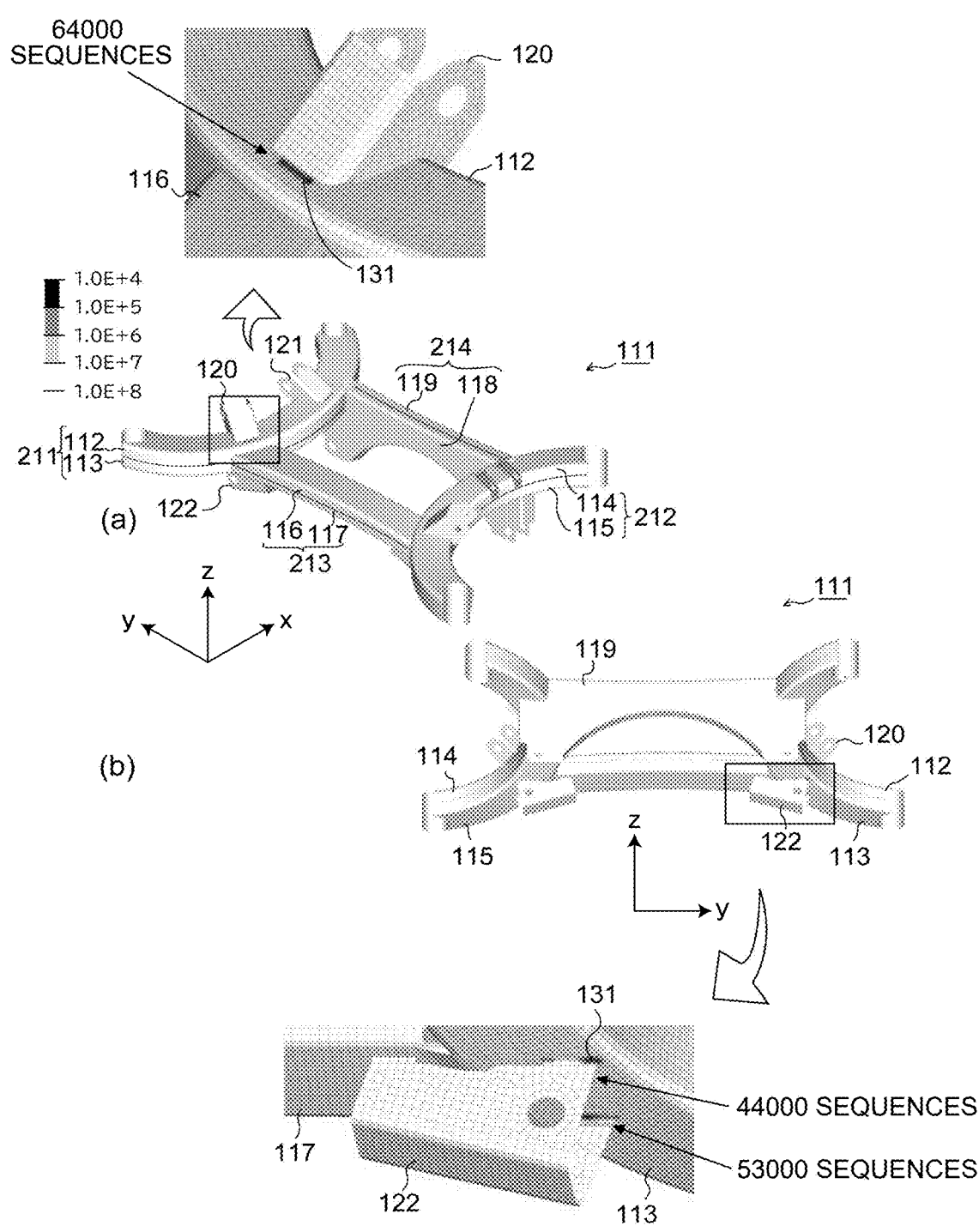
FIG. 9 illustrates an example of a fatigue life of an initial weld line under the variable amplitude load condition and a result of the positions of initial weld lines having the three shortest fatigue lives (minimum fatigue lives) in the first embodiment of the present invention.

FIG. 9 illustrates an example of the positions of the initial weld lines 131 having the three shortest fatigue lives of fatigue lives of the initial weld lines 131 determined by using a result of stress analysis in which the variable amplitude load condition in FIG. 7 and the constraint condition in FIG. 5 are given to the rear subframe model 111 and a result of the fatigue lives thereof.

The fatigue lives of the initial weld lines 131 in FIG. 9 are calculated under a variable amplitude load condition with the mount bushings a to d to be attached to the automotive body being completely restrained and the tire input point 100 on the right of the automotive body being set as the load input point A in the rear subframe model 111. In the variable amplitude load condition, one cycle of the first vibration pattern and five cycles of the second vibration pattern are combined to form one sequence. In the first vibration pattern, a variable amplitude load of ±2.5 kN is input in the front-rear direction (Input 1). In the second vibration pattern, a variable amplitude load of ±6.0 kN is input in the inward/outward direction (Input 2).

As illustrated in FIG. 9, the fatigue lives determined for the initial weld lines 131 of the rear subframe model 111 are 44000 sequences and 53000 sequences at portions where the subframe lower 113 and the bracket 122 are bonded and joined, and 64000 sequences at a portion where the subframe upper 112 and the bracket 120 are bonded and joined. These weld lines have the three shortest fatigue lives. From this result, the target fatigue life setting unit 19 sets, as a target fatigue life, a fatigue life of 44000 sequences or more of the initial weld line 131 bonding and joining the subframe lower 113 and the bracket 122 with each other.

The target fatigue life setting unit 19 may calculate the fatigue lives by using commercially available fatigue life predicting analysis software as described above. For example, when a fatigue life of an initial weld line 131 modeled by a two-dimensional element is calculated by using commercially available fatigue life predicting analysis software, the fatigue life of the initial weld line 131 can be calculated by inputting a condition such as stress of the initial weld line 131 to the fatigue life predicting analysis software. A stress value of a two-dimensional element of each part model to which a two-dimensional element of the initial weld line 131 is coupled or nominal structure stress determined by force and moment acting on both ends of the two-dimensional element of the initial weld line 131 can be used as the stress of the initial weld line 131.

Furthermore, the S-N diagram may change depending on the load state of a load, for example, whether average stress is compressive stress or tensile stress even in the same stress amplitude. A value of the fatigue life predicting analysis software and an experimental value can be referred to. Alternatively, when the fatigue life is calculated by using the nominal structure stress, one S-N diagram including different load states may be used. Moreover, as illustrated in FIG. 8, the S-N diagram may be represented by applying various rules including Miner's rule and modified Miner's rule. In the Miner's rule, fracture is not determined at a fatigue limit or less on a low stress side. In modified Miner's rule, fracture is counted as damage even at the fatigue limit or less.

(Optimization Analysis Condition Setting Unit)

In order to perform optimization analysis in which an optimization analysis model is to be optimized, the optimization analysis condition setting unit 21 determines the number of cycles to fracture of each candidate 155 for weld line for each loading condition of each vibration pattern set by the variable amplitude load condition setting unit 17. The optimization analysis condition setting unit 21 determines the sum of ratios between the cycle number of the loading condition of each vibration pattern and the number of cycles to fracture by the number of sequences of a variable amplitude load condition set by the target fatigue life setting unit 19 as the liner cumulative damage DM of each candidate 155 for weld line. The optimization analysis condition setting unit 21 sets a condition regarding the liner cumulative damage of a candidate 155 for weld line, which is to be left by the optimization analysis, a condition regarding the stiffness of the optimization analysis model, and a condition regarding the length of the candidate 155 for weld line, which is to be left by the optimization analysis, as an objective or a constraint, which is an optimization analysis condition.

The optimization analysis condition includes two types of an objective and a constraint. Only one objective is set in accordance with the purpose of the optimization analysis. The objective includes a condition regarding stiffness, a condition regarding a fatigue life, and a condition regarding a joining length.

In the condition regarding stiffness, for example, a predetermined position of the analysis object model can be set as a stiffness evaluation point, and the displacement or strain of the stiffness evaluation point can be used as an index. Then, in the variable amplitude load condition, for example, minimization of a value obtained by adding together displacements of a stiffness evaluation point A under the loading condition of each vibration pattern or minimization of displacement of the stiffness evaluation point A under the loading condition of each vibration pattern can be set as a condition regarding stiffness. The condition regarding a fatigue life can include a condition that the fatigue life is larger than the target fatigue life set by the target fatigue life setting unit 19. Furthermore, the joining length can be determined based on a proportion to the entire joining length.

A plurality of constraints set as necessary is imposed in performing the optimization analysis.

In the first embodiment, a condition that the fatigue life of the candidate 155 for weld line is larger than the target fatigue life set by the target fatigue life setting unit 19 can be set as a constraint. The number of cycles to fracture of the candidate 155 for weld line can be calculated by using the S-N diagram in FIG. 8 similarly to the number of cycles to fracture of the above-described initial weld line 131 under the variable amplitude load condition.

The condition regarding a fatigue life is not limited to a target fatigue life set by the target fatigue life setting unit 19, which is given as a constraint as it is. A constraint may be given in which the liner cumulative damage DM of the candidate 155 for weld line by the number of sequences set as a target fatigue life by the target fatigue life setting unit 19 under the variable amplitude load condition satisfies the liner cumulative damage DM<1 in which no fatigue fracture occurs.

Similarly to the above-described liner cumulative damage DM of the initial weld line 131, the liner cumulative damage DM of the candidate 155 for weld line can be calculated by using the S-N diagram in FIG. 8 and Expression (2) by using, for example, the stress of a two-dimensional element of a part model to which a two-dimensional element modeled as the candidate 155 for weld line is coupled and nominal structure stress calculated from force and moment acting on both sides of the two-dimensional element.

Moreover, in the condition regarding the length of the candidate 155 for weld line, the length of the candidate 155 for weld line, which is to be left, can be set to a predetermined value. In the first embodiment, a constraint is set in which the length of the candidate 155 for weld line, which is to be left, is equal to or shorter than the length of the initial weld line 131.

In the optimization analysis condition regarding the length of the candidate 155 for weld line, when densimetry is applied in topology optimization in optimization analysis performed by the optimization analysis unit 23, the volume of the candidate 155 for weld line, which is calculated based on the density of an element (e.g., two-dimensional element and three-dimensional element) modeled as the candidate 155 for weld line, may be given as a constraint.

(Optimization Analysis Unit)

The optimization analysis unit 23 gives the variable amplitude load condition set by the variable amplitude load condition setting unit 17 to the optimization analysis model, performs optimization analysis under the optimization analysis condition, and determines the arrangement of the candidate 155 for weld line as optimal arrangement of a weld line for achieving one of reducing the liner cumulative damage of the candidate 155 for weld line, improving the stiffness of the optimization analysis model, and minimizing the length of the candidate 155 for weld line, which is to be left.

The topology optimization can be applied to the optimization analysis performed by the optimization analysis unit 23. When the densimetry is used in the topology optimization, a normalized virtual density having a value of zero to one is given to an element (e.g., two-dimensional element and three-dimensional element) modeled as the candidate 155 for weld line as a design variable, and the value of a density satisfying the optimization analysis condition is calculated.

Then, the calculated density having a value of one indicates complete presence of the candidate 155 for weld line. The calculated density having a value of zero indicates absence of the candidate 155 for weld line. The calculated density having an intermediate value thereof indicates an intermediate state of bonding and joining of a parts assembly using the candidate 155 for weld line.

Therefore, when there are many intermediate densities in which the densimetry is applied in the topology optimization, performing discretization using a penalty coefficient is preferred as indicated in Expression (3).

$$K_M(\rho) = \rho^p K \qquad (3)$$

where, $K_M$: stiffness matrix obtained by imposing penalty on stiffness matrix of element $K$: stiffness matrix of element $\rho$: normalized density $p$: penalty coefficient Although two or more penalty coefficients are often used in discretization, four or more penalty coefficients are preferably used in performing analysis for optimizing a joining position according to the present invention.

The optimization analysis unit 23 may perform optimization analysis by the topology optimization as described above, or may perform optimization analysis by another calculation method.

FIG. 10 illustrates an example of the optimal arrangement of a weld line 157, which has been determined by the optimization analysis unit 23 performing optimization analysis by applying the densimetry in the topology optimization. The effects of the optimal arrangement of the weld line, which has been determined in the first embodiment, will be described in Example 1 to be described later.

<Automotive Body Joining Position Optimization Analysis Method>

In an automotive body joining position optimization analysis method (hereinafter, simply referred to as "optimization analysis method") according to the first embodiment of the present invention, a computer executes the following steps, and optimization analysis for determining the optimal arrangement of a weld line is performed for achieving one of improving stiffness of the automotive body model, improving a fatigue life near the weld line for bonding and joining a parts assembly in the automotive body model, and minimizing the length of the weld line for all or a part of an automotive body model having a plurality of part models including a beam element, a two-dimensional element, and/or a three-dimensional element and having the initial weld line 131 for bonding and joining the plurality of part models as a parts assembly. As illustrated in FIG. 11, the optimization analysis method includes an analysis object model setting step S1, an optimization analysis model generating step S3, a variable amplitude load condition setting step S5, a target fatigue life setting step S7, an optimization analysis condition setting step S9, and an optimization analysis step S11. Each of these steps will be described below. The optimization analysis device 1 (FIG. 1) including a computer performs each of the following steps.

<<Analysis Object Model Setting Step>>

In the analysis object model setting step S1, all or a part of an automotive body model is set as an analysis object model.

In the first embodiment, in the analysis object model setting step S1, the analysis object model setting unit 13 sets the rear subframe model 111, which is a part of the automotive body model, as an analysis object model.

<<Optimization Analysis Model Generating Step>>

In the optimization analysis model generating step S3, all candidates 155 for weld line, serving as candidates for weld lines in optimal arrangement, are set to the analysis object model to generate the optimization analysis model.

In the first embodiment, in the optimization analysis model generating step S3, the optimization analysis model generating unit 15 generates an additional weld line 153 between initial weld lines 131 preset in the rear subframe model 111, and sets both the initial weld lines 131 and the additional weld line 153 as candidates 155 for weld line.

<<Variable Amplitude Load Condition Setting Step>>

In the variable amplitude load condition setting step S5, a variable amplitude load condition is set in which a variable amplitude load to be given to the optimization analysis model is divided into loading conditions of a plurality of different vibration patterns and a predetermined cycle number of loading conditions of the vibration patterns are combined to form one sequence.

In the first embodiment, in the variable amplitude load condition setting step S5, the variable amplitude load condition setting unit 17 of the optimization analysis device 1 sets a variable amplitude load condition (see FIG. 7), and further sets a constraint condition. In the variable amplitude load condition, one cycle of a loading condition of the first vibration pattern in FIG. 5(*a*) and five cycles of the loading condition of the second vibration pattern in FIG. 5(*b*) are combined to form one sequence. The constraint condition constrains constraint points a to d as illustrated in FIG. 5.

<<Target Fatigue Life Setting Step>>

In the target fatigue life setting step S7, a target fatigue life of the optimization analysis model 151 is set based on the number of sequences of the variable amplitude load condition set in the variable amplitude load condition setting step S5. The number of sequences of the variable amplitude load condition, which corresponds to a target fatigue life, may be set as the target fatigue life of the optimization analysis model 151 by separately performing stress analysis by giving a loading condition of a vibration pattern under the variable amplitude load condition set in the variable amplitude load condition setting step S5 to the analysis object model, calculating the number of sequences of the variable amplitude load condition, which corresponds to a fatigue life under the variable amplitude load condition of the initial weld line 131 of the analysis object model, by using a result of the stress analysis, and referring to the calculated number of sequences of the variable amplitude load condition, which corresponds to the fatigue life of the initial weld line 131. The predetermined number of sequences of the variable amplitude load condition may be set as the target fatigue life from a conventional empirical rule.

The candidate 155 for weld line, which is to be optimized, is to satisfy the target fatigue life. At least the number of sequences equal to or more than the number of sequences of the variable amplitude load condition, which corresponds to the shortest fatigue life (minimum fatigue life) of each of the initial weld lines 131 calculated in the target fatigue life setting step S7, is set as the target fatigue life.

<<Optimization Analysis Condition Setting Step>>

In the optimization analysis condition setting step S9, in order to perform optimization analysis in which the optimization analysis model 151 is to be optimized, the number of cycles to fracture of each candidate 155 for weld line is determined for each loading condition of each of a plurality of different vibration patterns in the variable amplitude load condition setting step S5. The sum of ratios between the cycle number of the loading condition of each vibration pattern and the number of cycles to fracture by the number of sequences of the variable amplitude load condition set in the target fatigue life setting step S7 is determined as the liner cumulative damage DM of each candidate 155 for weld line. A condition regarding the liner cumulative damage of a candidate 155 for weld line, which is to be left by the optimization analysis, a condition regarding the stiffness of the optimization analysis model 151, and a condition regarding the length of the candidate 155 for weld line, which is to be left by the optimization analysis, are set as an objective or a constraint, which is an optimization analysis condition.

In the first embodiment, in the optimization analysis condition setting step S9, the optimization analysis condition setting unit 21 sets maximization of the stiffness (minimization of displacement of stiffness evaluation point A) of the optimization analysis model 151 as an objective, and sets, as optimization analysis conditions, the constraint that the fatigue life of the candidate 155 for weld line is larger than the target fatigue life and a constraint that the length of the candidate 155 for weld line, which is to be left, is equal to or shorter than the length of the initial weld line 131.

In the condition regarding stiffness, for example, a predetermined position of the analysis object model can be set as a stiffness evaluation point, and the displacement or strain of the stiffness evaluation point can be used as an index. Then, in the variable amplitude load condition, for example, minimization of a value obtained by dividing a variable amplitude load into vibration patterns and adding together displacements of the stiffness evaluation point A under loading conditions of the vibration patterns or minimization of displacement of the stiffness evaluation point A under the variable amplitude load condition can be set as a condition regarding stiffness.

Furthermore, the condition regarding a fatigue life is not limited to the target fatigue life set in the target fatigue life setting step S7, which is given as a constraint as it is. For example, a constraint that the liner cumulative damage DM of the candidate 155 for weld line is equal to or smaller than a liner cumulative damage corresponding to the target fatigue life may be given.

<<Optimization Analysis Step>>

In the optimization analysis step S11, the variable amplitude load condition set in the variable amplitude load condition setting step S5 is given to the optimization analysis model 151, optimization analysis is performed under the optimization analysis condition, and the arrangement of the candidate 155 for weld line is determined as optimal arrangement of a weld line for achieving one of reducing the liner cumulative damage of the candidate 155 for weld line, improving the stiffness of the optimization analysis model 151, and minimizing the length of the candidate 155 for weld line, which is to be left.

In the first embodiment, in the optimization analysis step S11, the optimization analysis unit 23 performs optimization analysis by setting the candidate 155 for weld line, which has been set in the rear subframe model 111 as an optimization target, and determines the arrangement of the candidate 155 for weld line, which satisfies the optimization analysis condition, as the optimal arrangement of the weld line 157 as illustrated in FIG. 10.

<Automotive Body Joining Position Optimization Analysis Program>

The first embodiment of the present invention can be configured as an automotive body joining position optimization analysis program, which causes each of units of the automotive body joining position optimization analysis device 1 configured by a computer to function. That is, the automotive body joining position optimization analysis program according to the first embodiment of the present invention is used to perform optimization analysis in which all or a part of an automotive body model is set as an analysis object model and optimal arrangement of a weld line is determined for achieving one of improving stiffness of the automotive body model, improving a fatigue life of the weld line for bonding and joining a parts assembly in the automotive body model, and minimizing the length of the weld line for the analysis object model. The automotive body joining position optimization analysis program according to the first embodiment of the present invention causes a computer to function as the analysis object model setting unit 13, the optimization analysis model generating unit 15, the variable amplitude load condition setting unit 17, the target fatigue life setting unit 19, the optimization analysis condition setting unit 21, and the optimization analysis unit 23 as illustrated in FIG. 1 as an example.

According to the automotive body joining position optimization analysis method, device and program according to the first embodiment, the optimal arrangement of a weld line can be determined for achieving one of minimizing the length of the candidate 155 for weld line, improving the stiffness of the analysis object model, and improving the fatigue life of a weld line for bonding and joining a parts assembly in a case where a variable amplitude load having a temporally varying amplitude, direction, and the like is input to the automotive body by performing optimization analysis for the candidate 155 for weld line by setting all or a part of an automotive body model as an analysis object model, generating the optimization analysis model 151 in which the candidate 155 for weld line, which bonds and joins a parts assembly to the analysis object model, is set, and setting an optimization analysis condition (objective or constraint) regarding the length and the fatigue life of the candidate 155 for weld line, which is to be optimized, and the stiffness of the optimization analysis model 151.

Second Embodiment

In the above-described first embodiment of the present invention, the candidate 155 for weld line, which satisfies the optimization analysis condition, is determined by applying the topology optimization based on the densimetry in the optimization analysis. Whether the candidate 155 for weld line is to be left or to disappear in the topology optimization is determined based on a value of the density of the candidate 155 for weld line.

As described above, the density in the topology optimization based on the densimetry is a normalized virtual density having a value of zero to one. The density having a value of one indicates that the candidate 155 for weld line is completely left. The density having a value of zero indicates that the candidate 155 for weld line has disappeared. The density having an intermediate value from zero to one indicates an intermediate state between being left and disappearance of the candidate 155 for weld line.

Therefore, as described above, when there are many intermediate densities in which the densimetry is applied in the topology optimization, performing discretization using a penalty coefficient is preferred as indicated in Expression (1).

Then, when discretization is performed by giving a penalty coefficient in the topology optimization, any of the fatigue life of a weld line and the stiffness of an analysis object model in the analysis object model, in which the arrangement of a predetermined length of the candidate 155 for weld line, which has been left by optimization analysis, is set as the optimal arrangement of the weld line, satisfies target performance of the fatigue life and the stiffness.

When discretization is not performed by giving a penalty coefficient in the topology optimization, the candidate 155 for weld line, which has an intermediate density, is left in the optimization analysis model 151 after optimization analysis was performed. Then, in order to determine the optimal arrangement of a predetermined length of weld line based on a result of optimization analysis, for example, the arrangement of the candidate 155 for weld line, which has a density of equal to or greater than a certain threshold, is selected as the optimal arrangement of a weld line, and the arrangement of the candidate 155 for weld line, which has a value of an intermediate density less than the threshold is not selected as the optimal arrangement of a weld line.

When the optimal arrangement of a weld line, determined as described above, is newly set in the analysis object model to calculate the fatigue life of the analysis object model, stress concentrates on a specific weld line, which may cause problems of a decrease of the fatigue life to less than the target fatigue life, a decrease in the stiffness of the analysis object model, and a fatigue life and/or stiffness not satisfying predetermined performance.

Therefore, as a result of intensive studies to solve the above-described problem, the following insight has been acquired. That is, it is determined whether or not the fatigue life and the stiffness of the analysis object model in which the arrangement of the selected candidate 155 for weld line is set instead of the initial weld line 131 satisfy the predetermined performance. When it is determined that the fatigue life and the stiffness do not satisfy the predetermined performance, an optimization analysis condition (e.g., threshold of density) is changed, and the optimization analysis is performed again, and thereby the optimal arrangement of a weld line, which satisfies the predetermined performance for the stiffness and the fatigue life, can be determined.

The automotive body joining position optimization analysis method, device and program according to the second embodiment have been made based on the above-described insight, and a specific configuration thereof will be described. Redundant descriptions of the same components as those of the automotive body joining position optimization analysis method, device and program according to the first embodiment will be omitted.

<Automotive Body Joining Position Optimization Analysis Device>

A configuration of an automotive body joining position optimization analysis device according to the second embodiment of the present invention will be described below.

Figure 12:
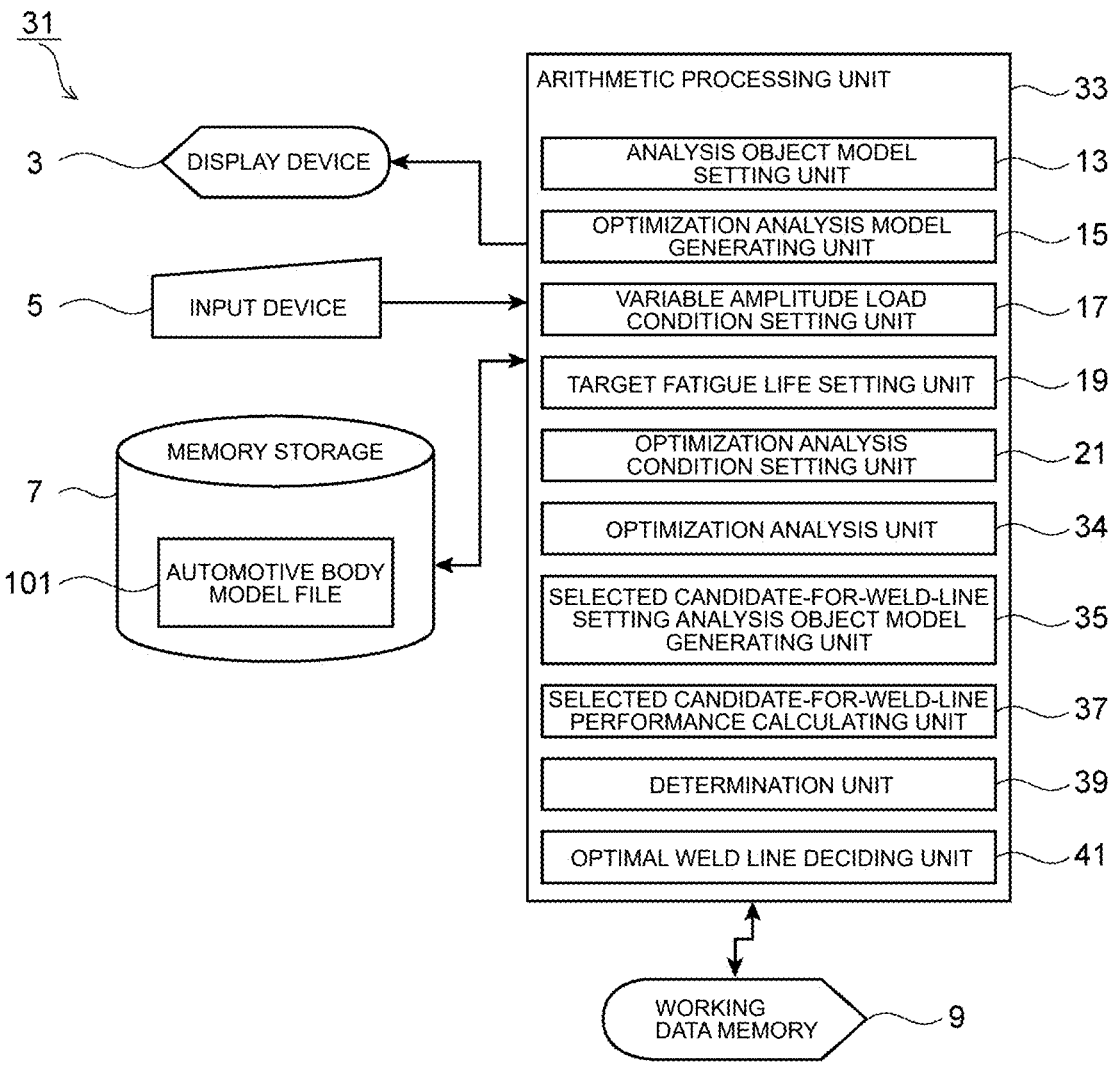
FIG. 12 is a block diagram of an automotive body joining position optimization analysis device according to a second embodiment of the present invention.

An optimization analysis device 31 performs optimization analysis in which all or a part of an automotive body model is set as an analysis object model and optimal arrangement of a weld line is determined for achieving one of improving stiffness of the automotive body model, improving a fatigue life of the weld line for bonding and joining a parts assembly in the automotive body model, and minimizing the length of the weld line for all or a part of the automotive body model having a plurality of part models including a beam element, a two-dimensional element, and/or a three-dimensional element and having the initial weld line 131 for bonding and joining the plurality of part models as a parts assembly. The optimization analysis device 31 includes a personal computer (PC). As illustrated in FIG. 12, the optimization analysis device 31 includes the display device 3, the input device 5, the memory storage 7, the working data memory 9, and an arithmetic processing unit 33. Then, the display device 3, the input device 5, the memory storage 7, and the working data memory 9 are connected to the arithmetic processing unit 33. The functions thereof are executed by commands from the arithmetic processing unit 33.

<<Arithmetic Processing Unit>>

As illustrated in FIG. 12, the arithmetic processing unit 33 includes the analysis object model setting unit 13, the optimization analysis model generating unit 15, the variable amplitude load condition setting unit 17, the target fatigue life setting unit 19, the optimization analysis condition setting unit 21, and an optimization analysis unit 34. The arithmetic processing unit 33 further includes a selected candidate-for-weld-line setting analysis object model generating unit 35, a selected candidate-for-weld-line performance calculating unit 37, a determination unit 39, and an optimal weld line deciding unit 41. The arithmetic processing unit 33 includes a central processing unit (CPU) such as a PC. Each of these units functions when the CPU executes a predetermined program.

The analysis object model setting unit 13, the optimization analysis model generating unit 15, the variable amplitude load condition setting unit 17, the target fatigue life setting unit 19, and the optimization analysis condition setting unit 21 in the arithmetic processing unit 33 have functions similar to those in the above-described first embodiment, so that the functions of the optimization analysis unit 34, the selected candidate-for-weld-line setting analysis object model generating unit 35, the selected candidate-for-weld-line performance calculating unit 37, the determination unit 39, and the optimal weld line deciding unit 41 will be described below.

(Optimization Analysis Unit)

The optimization analysis unit 34 gives the variable amplitude load condition set by the variable amplitude load condition setting unit 17 to the optimization analysis model 151, performs optimization analysis under the optimization analysis condition, and causes the arrangement of the candidate 155 for weld line to be left as a temporary optimal arrangement of a weld line for achieving one of reducing the liner cumulative damage of the candidate 155 for weld line, improving the stiffness of the optimization analysis model 151, and minimizing the length of the candidate 155 for weld line, which is to be left.

The topology optimization can be applied to the optimization analysis performed by the optimization analysis unit 34 as in the optimization analysis performed by the optimization analysis unit 23 of the above-described first embodiment.

(Selected Candidate-for-Weld-Line Setting Analysis Object Model Generating Unit)

The selected candidate-for-weld-line setting analysis object model generating unit 35 generates a selected candidate-for-weld-line setting analysis object model by selecting a candidate 155 for weld line, which has a predetermined length, from candidates 155 for weld line, which have been left as temporary optimal arrangement by optimization analysis performed by the optimization analysis unit 34, and setting the selected candidate 155 for weld line in an analysis object model instead of the initial weld line 131.

In the topology optimization based on the densimetry, the density of an element (e.g., two-dimensional element) modeled as the candidate 155 for weld line is calculated. The selected candidate-for-weld-line setting analysis object model generating unit 35 thus can select a predetermined length from candidates 155 for weld line, which have densities of elements of a predetermined threshold or more to set the predetermined length in the analysis object model.

(Selected Candidate-for-Weld-Line Performance Calculating Unit)

The selected candidate-for-weld-line performance calculating unit 37 performs stress analysis by giving a loading condition and a constraint condition of each vibration pattern in the variable amplitude load condition set by the variable amplitude load condition setting unit 17 to the selected candidate-for-weld-line setting analysis object model, and calculates the fatigue life of the selected candidate 155 for weld line under the variable amplitude load condition and the stiffness of the selected candidate-for-weld-line setting analysis object model by using a result of the stress analysis.

In order to determine the fatigue life of the candidate 155 for weld line, which has been set in the selected candidate-for-weld-line setting analysis object model, under the variable amplitude load condition, as in the case where the above-described target fatigue life setting unit 19 calculates a fatigue life, the liner cumulative damage DM (see Expression (2)) is required to be calculated based on the linear cumulative damage rule by using stress of the candidate 155 for weld line, which has been determined by the stress analysis for the selected candidate-for-weld-line setting analysis object model. The fatigue life can be determined by commercially available fatigue life predicting analysis software.

Then, for example, the stress of a two-dimensional element of a part model to which a two-dimensional element modeled as the candidate 155 for weld line is coupled and the nominal structure stress calculated from force and moment acting on both sides of the two-dimensional element of the candidate 155 for weld line can be used as the stress of the candidate 155 for weld line, which is to be used for calculating the liner cumulative damage DM.

Furthermore, in the stiffness of the selected candidate-for-weld-line setting analysis object model, for example, a predetermined position can be set as a stiffness evaluation point, and the displacement or strain thereof can be set as an index. The displacement of the stiffness evaluation point under the variable amplitude load condition and a value obtained by dividing a variable amplitude load into vibration patterns and adding together the displacements of the stiffness evaluation point of the vibration patterns under a loading condition can be set as indices.

(Determination Unit)

The determination unit 39 determines whether or not the fatigue life of the candidate 155 for weld line in the selected candidate-for-weld-line setting analysis object model under the variable amplitude load condition and the stiffness of the selected candidate-for-weld-line setting analysis object model satisfy predetermined performance exceeding an analysis object model in which the initial weld line 131 is set.

The predetermined performance related to a fatigue life can be within a predetermined range of the target fatigue life set by the target fatigue life setting unit 19.

(Optimal Weld Line Deciding Unit)

When the determination unit 39 determines that the predetermined performance is satisfied, the optimal weld line deciding unit 41 decides the arrangement of the candidate 155 for weld line, which has been selected by the selected candidate-for-weld-line setting analysis object model generating unit 35, as optimal arrangement of the weld line. When the determination unit 39 determines that the predetermined performance is not satisfied, the optimal weld line deciding unit 41 changes a condition regarding the liner cumulative damage of the candidate 155 for weld line, which is to be left by optimization analysis, set by the optimization analysis condition setting unit 21, a condition regarding the stiffness of the optimization analysis model 151, or a condition regarding the length of the candidates 155 for weld line, which are to be left by optimization analysis, until the predetermined performance is satisfied. The optimal weld line deciding unit 41 repeats processing performed by the optimization analysis unit 34, the selected candidate-for-weld-line setting analysis object model generating unit 35, the selected candidate-for-weld-line performance calculating unit 37, and the determination unit 39. The optimal weld line deciding unit 41 decides the arrangement of the candidate 155 for weld line, which has been selected at the time when the predetermined performance was satisfied, as optimal arrangement of a weld line.

When the determination unit 39 does not determine that the stiffness and the fatigue life satisfy the predetermined performance, the optimal weld line deciding unit 41 can cause the optimization analysis condition setting unit 21 to change an optimization analysis condition such as a threshold for selecting the candidate 155 for weld line in order to increase the length of the candidate 155 for weld line, which is to be left in optimization analysis.

When the optimization analysis condition setting unit 21 changes the condition regarding the liner cumulative damage of the candidate 155 for weld line, the condition regarding the stiffness of the optimization analysis model 151, or the condition regarding the length of the candidate 155 for weld line, which is to be left, one of the conditions may be changed, or two or three conditions may be simultaneously changed.

<Automotive Body Joining Position Optimization Analysis Method>

Figure 13:
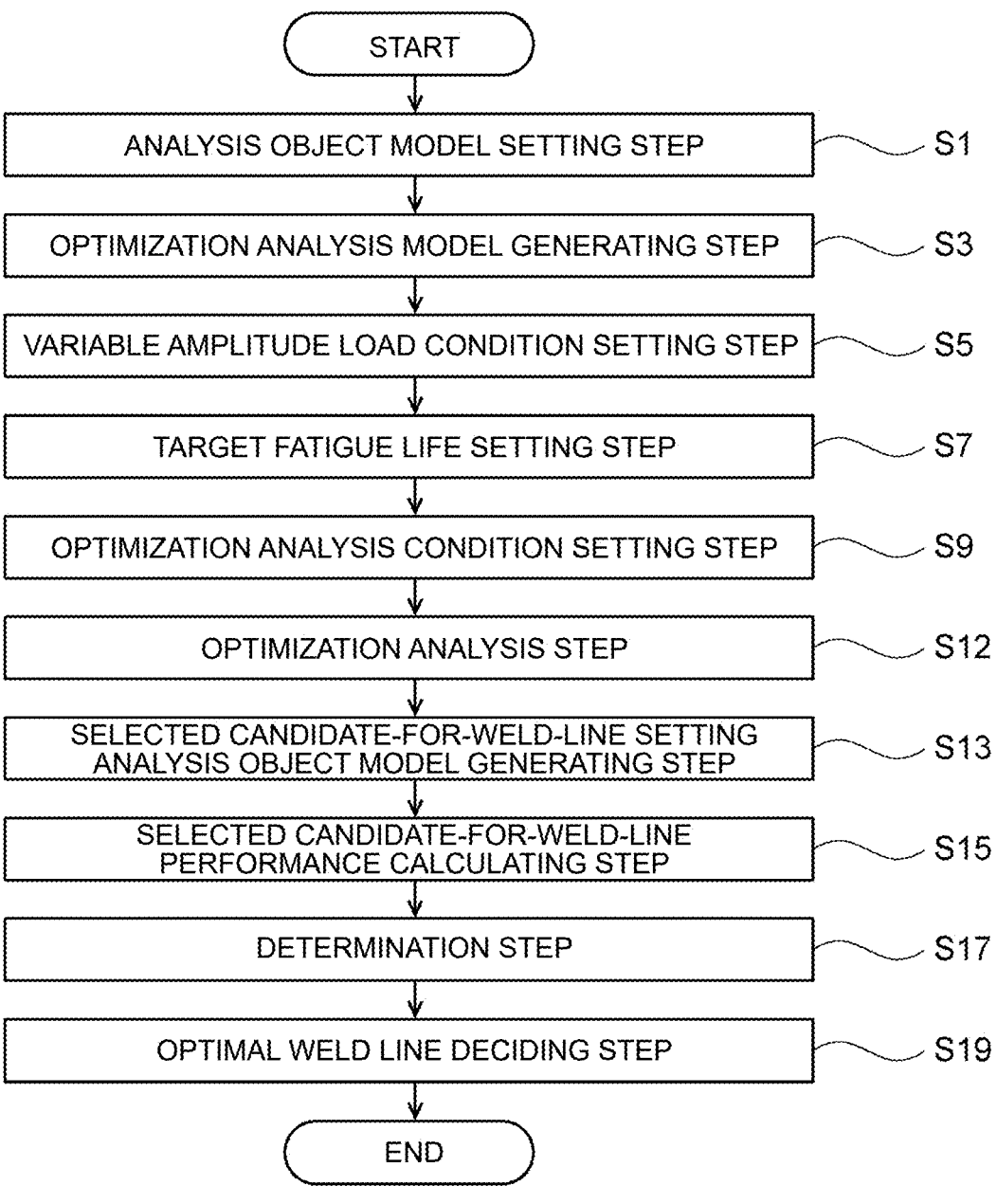
FIG. 13 is a flowchart illustrating a flow of processing in the automotive body joining position optimization analysis method according to the second embodiment of the present invention.

In an automotive body joining position optimization analysis method according to the second embodiment of the present invention, optimization analysis is performed in which a computer executes the following steps, and the optimal arrangement of a weld line is determined for achieving one of improving stiffness of the automotive body model, improving a fatigue life of the weld line for bonding and joining a parts assembly in the automotive body model, and minimizing the length of the weld line for all or a part of an automotive body model having a plurality of part models including a beam element, a two-dimensional element, and/or a three-dimensional element and having the initial weld line 131 for bonding and joining the plurality of part models as a parts assembly. As illustrated in FIG. 13, the automotive body joining position optimization analysis method according to the second embodiment of the present invention includes the analysis object model setting step S1, the optimization analysis model generating step S3, the variable amplitude load condition setting step S5, the target fatigue life setting step S7, the optimization analysis condition setting step S9, an optimization analysis step S12, a selected candidate-for-weld-line setting analysis object model generating step S13, a selected candidate-for-weld-line performance calculating step S15, a determination step S17, and an optimal weld line deciding step S19.

The analysis object model setting step S1, the optimization analysis model generating step S3, the variable amplitude load condition setting step S5, the target fatigue life setting step S7, and the optimization analysis condition setting step S9 among the above-described steps are similar to those in the above-described first embodiment, so that the optimization analysis step S12, the selected candidate-for-weld-line setting analysis object model generating step S13, the selected candidate-for-weld-line performance calculating step S15, the determination step S17, and the optimal weld line deciding step S19 will be described below. The optimization analysis device 31 (FIG. 12) including a computer performs each of the steps in the optimization analysis method according to the second embodiment.

<<Optimization Analysis Step>>

In the optimization analysis step S12, the variable amplitude load condition set in the variable amplitude load condition setting step S5 is given to the optimization analysis model 151, optimization analysis is performed under the optimization analysis condition, and the arrangement of the candidate 155 for weld line is caused to be left as a temporary optimal arrangement of a weld line for achieving one of reducing the liner cumulative damage of the candidate 155 for weld line, improving the stiffness of the optimization analysis model 151, and minimizing the length of the candidate 155 for weld line, which is to be left.

In the second embodiment, in the optimization analysis step S12, the optimization analysis unit 34 performs optimization analysis by setting the candidate 155 for weld line, set in the rear subframe model 111 as an optimization target, and causes the arrangement of the candidate 155 for weld line, which satisfies the optimization analysis condition, to be left as the temporary optimal arrangement of the weld line 157 as illustrated in FIG. 10.

<<Selected Candidate-for-Weld-Line Setting Analysis Object Model Generating Step>>

In the selected candidate-for-weld-line setting analysis object model generating step S13, a selected candidate-for-weld-line setting analysis object model is generated by selecting a candidate 155 for weld line, which has a predetermined length, from candidates 155 for weld line, which have been left as temporary optimal arrangement by optimization analysis in the optimization analysis step S12, and setting the selected candidate 155 for weld line as an analysis object model instead of the initial weld line 131.

In the second embodiment, the selected candidate-for-weld-line setting analysis object model generating unit 35 performs the selected candidate-for-weld-line setting analysis object model generating step S13.

<<Selected Candidate-for-Weld-Line Performance Calculating Step>>

In the selected candidate-for-weld-line performance calculating step S15, stress analysis is performed by giving a loading condition and a constraint condition of each vibration pattern in the variable amplitude load condition set in the variable amplitude load condition setting step S5 to the selected candidate-for-weld-line setting analysis object model, and the fatigue life of the selected candidate 155 for weld line under the variable amplitude load condition and the stiffness of the selected candidate-for-weld-line setting analysis object model are calculated by using a result of the stress analysis. In the second embodiment, the selected candidate-for-weld-line performance calculating unit 37 performs the selected candidate-for-weld-line performance calculating step S15.

<<Determination Step>>

In the determination step S17, it is determined whether or not the fatigue life of the candidate 155 for weld line in the selected candidate-for-weld-line setting analysis object model under the variable amplitude load condition and the stiffness of the selected candidate-for-weld-line setting analysis object model satisfy predetermined performance exceeding an analysis object model in which the initial weld line 131 is set. In the second embodiment, the determination unit 39 performs the determination step S17.

As described above, the predetermined performance related to a fatigue life can be within a predetermined range of the target fatigue life set by the target fatigue life setting unit 19.

<<Optimal Weld Line Deciding Step>>

In the optimal weld line deciding step S19, when it is determined, in the determination step S17, that the predetermined performance is satisfied, the arrangement of the candidate 155 for weld line, which has been selected in the selected candidate-for-weld-line setting analysis object model generating step S13, is decided as optimal arrangement of the weld line. When it is determined, in the determination step S17, that the predetermined performance is not satisfied, a condition regarding the liner cumulative damage of the candidate 155 for weld line, which is to be left by optimization analysis, set in the optimization analysis condition setting step S9, a condition regarding the stiffness of the optimization analysis model 151, or a condition regarding the length of the candidates 155 for weld line, which are to be left by optimization analysis, are changed until the predetermined performance is satisfied. The optimization analysis step S12, the selected candidate-for-weld-line setting analysis object model generating step S13, the selected candidate-for-weld-line performance calculating step S15, and the determination step S17 are repeated. The arrangement of the candidate 155 for weld line, which has been selected at the time when the predetermined performance was satisfied, is decided as optimal arrangement of a weld line. The predetermined performance may fail to be satisfied since there are a large number of candidates 155 for weld line, which have intermediate densities, and performance obtained by integrating these candidates 155 for weld line is determined in the determination step S17. In the second embodiment, the optimal weld line deciding unit 41 performs the optimal weld line deciding step S19.

When the condition regarding the liner cumulative damage of the candidate 155 for weld line, the condition regarding the stiffness of the optimization analysis model 151, or the condition regarding the length of the candidate 155 for weld line, which is to be left, are changed in the optimization analysis condition setting step S9, one of conditions may be changed, or two or three conditions may be simultaneously changed.

<Automotive Body Joining Position Optimization Analysis Program>

The second embodiment of the present invention can be configured as an automotive body joining position optimization analysis method program, which causes each of units of the automotive body joining position optimization analysis method device 31 configured by a computer to function. That is, the automotive body joining position optimization analysis program according to the second embodiment of the present invention is used to perform optimization analysis in which all or a part of an automotive body model is set as an analysis object model and optimal arrangement of a weld line is determined for achieving one of improving stiffness of the automotive body model, improving a fatigue life of the weld line for bonding and joining a parts assembly in the automotive body model, and minimizing the length of the weld line for all or a part of the automotive body model having a plurality of part models including a beam element, a two-dimensional element, and/or a three-dimensional element and having the initial weld line 131 for bonding and joining the plurality of part models as a parts assembly. The automotive body joining position optimization analysis program according to the second embodiment of the present invention causes a computer to function as the analysis object model setting unit 13, the optimization analysis model generating unit 15, the variable amplitude load condition setting unit 17, the target fatigue life setting unit 19, the optimization analysis condition setting unit 21, and the optimization analysis unit 34, and further causes the computer to function as the selected candidate-for-weld-line setting analysis object model generating unit 35, the selected candidate-for-weld-line performance calculating unit 37, the determination unit 39, and the optimal weld line deciding unit 41, as illustrated in FIG. 12 as an example.

As described above, in the automotive body joining position optimization analysis method, device and program according to the second embodiment, even when discretization is not performed in the topology optimization based on the densimetry, a case where a temporally varying load is input to the automotive body as during traveling of an actual automobile is targeted, and the optimal arrangement of a weld line can be appropriately decided for achieving one of minimizing the length of the candidate 155 for weld line, improving the stiffness of the analysis object model, and improving the fatigue life of a weld line for bonding and joining a parts assembly.

In the above description, the automotive body model obtained by modeling the entire automotive body is acquired, and the rear subframe model 111, which is a part of the automotive body model, is set as the analysis object model. In the present invention, however, the entire automotive body model may be set as an analysis object model, or a portion other than the rear subframe model 111 in the automotive body model may be set as an analysis object model. Furthermore, an automotive body part model, which is a part of the automotive body model, may be acquired, and the acquired automotive body part model may be set as an analysis object model.

Furthermore, although an example of a case where the initial weld line 131 having a length of 6540 mm is preset in the rear subframe model 111 has been described above, the length of the initial weld line 131 is not limited thereto.

Moreover, a case where the initial weld line 131 is preset in the rear subframe model 111 by an operator or another means has been described. In the present invention, however, the operator may newly set the initial weld line 131, or may further add and set the initial weld line 131 to an analysis object model in which the initial weld line 131 has been already set with the analysis object model setting unit or in the analysis object model setting step.

Although, in the first embodiment, the loading condition and the constraint condition in FIG. 5 are set to the rear subframe model 111, a variable amplitude load condition and a constraint condition can be appropriately set on the assumption of a portion of an automotive body to be analyzed and a variable amplitude load acting on an actual automotive body in the present invention.

Furthermore, in the examples of the first and second embodiments, target performance of the fatigue life of the candidate 155 for weld line is set based on the shortest fatigue life (minimum fatigue life) of the initial weld line 131 set in the analysis object model.

In the present invention, however, fatigue lives of the candidates 155 for weld line in the optimization analysis model 151 can be calculated. In the optimization analysis model 151, the additional weld line 153 is set in the initial weld line 131 before optimization analysis is performed (see FIG. 6). The minimum fatigue life can be decided from the calculated fatigue lives of the candidates 155 for weld line. A target fatigue life in the optimization analysis can be set so as to satisfy the following relation.

(Minimum fatigue life of initial weld line)≤(Target fatigue life of candidate for weld line)≤(Minimum fatigue life of candidate for weld line, in which weld line before optimization analysis has been set)

Moreover, although, in the above description, both the initial weld line 131 and the additional weld line 153 are subjected to optimization analysis as candidates 155 for weld line, the optimal arrangement of a weld line to be added to the initial weld line 131 may be determined by setting only the additional weld line 153 as the candidate 155 for weld line without setting the initial weld line 131 as a target of the optimization analysis.

Moreover, when optimization analysis is performed with the initial weld line 131 being set so as to be included in the candidate 155 for weld line, the candidate 155 for weld line, which bonds and joins a parts assembly in the optimization analysis, may disappear, and the parts assembly may fall apart into pieces, which may prevent the optimization analysis from being performed. In such a case, at least one fixed weld line, which is not set as a target of optimization analysis, can be provided in each parts assembly.

For example, the fixed weld line may be optionally selected from the initial weld lines 131. The fixed weld line may be selected from candidates for fixed weld line by setting the candidates for fixed weld line, separately performing stress analysis or optimization analysis of the analysis object model, and referring to the result.

Furthermore, although, in the above description, the fatigue life of the candidate 155 for weld line or the stiffness of the optimization analysis model 151 is set as an objective, the length of the candidate 155 for weld line may be set as the objective, and the fatigue life and the stiffness may be set as constraints.

Third Embodiment

In the automotive body joining position optimization analysis method according to the above-described first and second embodiments, optimization analysis for determining the optimal arrangement of a weld line is performed for achieving one of improving stiffness of an automotive body model having the initial weld line 131 for bonding and joining a plurality of part models as a parts assembly, improving a fatigue life of the weld line for bonding and joining the parts assembly in the automotive body model, and minimizing the length of the weld line. The present invention, however, can be configured as an automotive body manufacturing method of manufacturing an automotive body in which a weld line for bonding and joining a parts assembly in the automotive body is optimally arranged and the stiffness of the automotive body and the fatigue life of the weld line are improved.

In the automotive body manufacturing method according to the third embodiment, first, the optimal arrangement of a weld line is determined for all or a part of the automotive body model having an initial weld line for bonding and joining a plurality of part models as a parts assembly by using the automotive body joining position optimization analysis method according to the above-described first or second embodiment. Next, a joining position of the parts assembly in the automotive body is decided based on the determined optimal arrangement of the weld line of the automotive body model. Then, the parts assembly of the automotive body is bonded and joined at the decided joining position. Examples of a mode for deciding a joining position of a parts assembly in an automotive body can include the following.

In a specific example of the mode for deciding a joining position, position data of three-dimensional coordinates of the optimal arrangement of a weld line in an automotive body model acquired by using the method of performing analysis for optimizing a joining position of an automotive body is input to a CAD/CAM program in cooperation with an NC unit of a welding robot disposed in an automotive body welding process, and converted into NC data (NC program) for the welding robot. Furthermore, in a specific example of a mode for bonding and joining a parts assembly in an automotive body, the parts assembly of the automotive body is bonded and joined at the decided joining position by operating the welding robot disposed in the automotive body welding process using the NC data obtained by the conversion. As described above, according to the method of manufacturing an automotive body according to the third embodiment, a welding position in electric arc welding and the like of an automotive body structure can be optimally arranged. A fatigue life near a weld line can be improved. The stiffness of the automotive body can be improved. Welding costs can be reduced. High stiffness and weight reduction of the automotive body can be achieved.

Example 1

Figure 14:
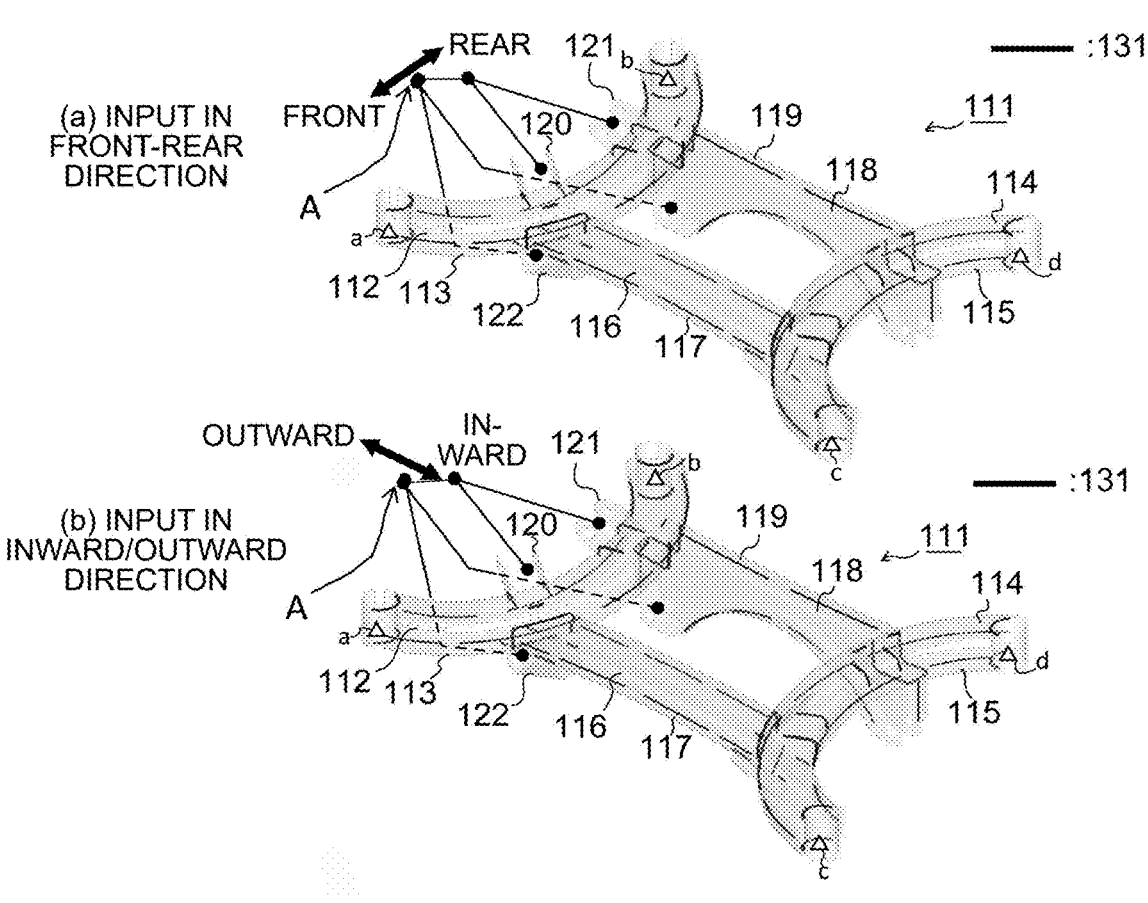
FIG. 14 is an explanatory diagram of a stiffness evaluation point in a rear subframe model, which is a part of an automotive body model set as an analysis target in Example 1.

Analysis to confirm the effects of the present invention was performed, and the analysis will be described. As illustrated in FIG. 14, the rear subframe model 111 obtained by modeling a rear subframe is targeted in the analysis. Optimal arrangement of a weld line for bonding and joining part models constituting the rear subframe model 111 as a parts assembly was determined by optimization analysis.

In the rear subframe model 111, as described in the first embodiment, the subframe upper 112 and the subframe lower 113 serving as part models are bonded and joined by electric arc welding to form the subframe R211. The subframe upper 114 and the subframe lower 115 are bonded and joined by electric arc welding to form the subframe L212. The cross member upper 116 and the cross member lower 117 are bonded and joined by electric arc welding to form the cross member front 213. The cross member front 118 and the cross member rear 119 are bonded and joined by electric arc welding to form the rear cross member 214. The subframe R211, the subframe L212, the cross member front 213, and the rear cross member 214 are further bonded and joined by electric arc welding to form a parallel cross structure. Each of these part models is modeled by a two-dimensional element.

Moreover, an initial weld line 131 for bonding and joining part models as a parts assembly is preset in the rear subframe model 111. The initial weld line 131 was modeled by two-dimensional elements that couple nodes of two-dimensional elements of the part models. The initial weld line 131 had a length of 6540 mm.

In Example 1, first, a target fatigue life was set based on a fatigue life of the initial weld line 131 under the variable amplitude load condition in FIG. 7.

The variable amplitude load condition in FIG. 7 includes a loading condition (see FIG. 5($a$)) of the first vibration pattern and a condition (see FIG. 5($b$)) of the second vibration pattern. In the first vibration pattern, a variable amplitude load of +2.5 kN is input in the front-rear direction (Input 1). In the second vibration pattern, a variable amplitude load of +6.0 kN is input in the inward/outward direction (Input 2). Then, one cycle of a loading condition of the first vibration pattern and five cycles of the loading condition of the second vibration pattern are combined to form a variable amplitude load condition of one sequence.

Next, stress analysis of the rear subframe model 111 was performed for each of the loading condition (FIG. 5($a$)) of the first vibration pattern and the loading condition (FIG. 5($b$)) of the second vibration pattern, and stress generated in the initial weld line 131 under a loading condition of each vibration pattern was determined.

Subsequently, the numbers $N_1$ and $N_2$ of cycles to fracture of the initial weld line 131 at the time when different stress amplitudes $\sigma_1$ and $\sigma_2$ generated in the initial weld line 131 under the variable amplitude load condition are independently generated in the initial weld line 131 were determined from the S-N diagram (FIG. 8).

Then, the numbers $N_1$ and $N_2$ of cycles to fracture at each stress amplitude and the cycle numbers $n_1$ (=one cycle) and $n_2$ (=20 cycles) of the loading condition of the first vibration pattern and the loading condition of the second vibration pattern in the variable amplitude load condition of one sequence were substituted into Expression (1) to determine the liner cumulative damage dm in one sequence.

Moreover, the number K of sequences in a case where the liner cumulative damage DM calculated by using Expression (2) is one or more was calculated as a fatigue life of the initial weld line 131 under the variable amplitude load condition, and a target fatigue life was set based on the shortest fatigue life of the fatigue lives of the initial weld lines 131.

After the target fatigue life was set, optimization analysis was performed for determining the optimal arrangement of a weld line in the rear subframe model 111. In the optimization analysis, first, as illustrated in FIG. 6, the optimization analysis model 151 was generated in which the additional weld line 153 was set between initial weld lines 131 in the rear subframe model 111 and the initial weld lines 131 and the additional weld line 153 were set as the candidates 155 for weld line.

Next, optimization analysis was performed by giving the loading condition and the constraint condition in FIG. 5 to determine the candidate 155 for weld line, which satisfies an optimization analysis condition. The optimization analysis based on the densimetry was applied for the optimization analysis. A penalty coefficient in the topology optimization was set to four, and discretization was performed.

Table 1 illustrates a combination of an objective and a constraint function in the optimization analysis condition.

TABLE 1

| | | Optimization analysis condition | | | |
|---|---|---|---|---|---|
| | | | | Constraint | |
| | | Objective | (I) Stiffness | (II) Fatigue life | (III) Weld length |
| <Example 1> | Invention Example 1 | (I) Stiffness | | ○ | ○ |
| | Comparative Example 1 | (I) Stiffness | | — | ○ |
| <Example 2> | Invention Example 2 | (II) Fatigue life | ○ | | ○ |
| | Comparative Example 2 | (II) Fatigue life | — | | ○ |
| <Example 3> | Invention Example 3 | (III) Weld length | ○ | ○ | |
| | Comparative Example 3-1 | (III) Weld length | ○ | — | |
| | Comparative Example 3-2 | (III) Weld length | — | ○ | |

In an objective and a constraint regarding stiffness, displacements of the stiffness evaluation point A (see FIG. 14) under the loading condition of the first vibration pattern and the loading condition of the second vibration pattern were equal to or smaller than displacements of the stiffness evaluation point A in a case where stress analysis was performed for the rear subframe model 111 in which the initial weld line 131 is set.

Furthermore, as in the case of the above-described initial weld line 131, in an objective and a constraint regarding a fatigue life, the liner cumulative damage DM of the candidate 155 for weld line under the variable amplitude load condition was calculated. Then, there is imposed a condition that the fatigue life calculated from the liner cumulative damage DM of each candidate 155 for weld line is larger than the target fatigue life.

Moreover, in an objective and a constraint regarding the length of the candidate 155 for weld line, that is, a joining length, the candidate 155 for weld line, which is to be left by optimization analysis, is set to have a length equal to or shorter than the length of the initial weld line 131.

Figure 15:
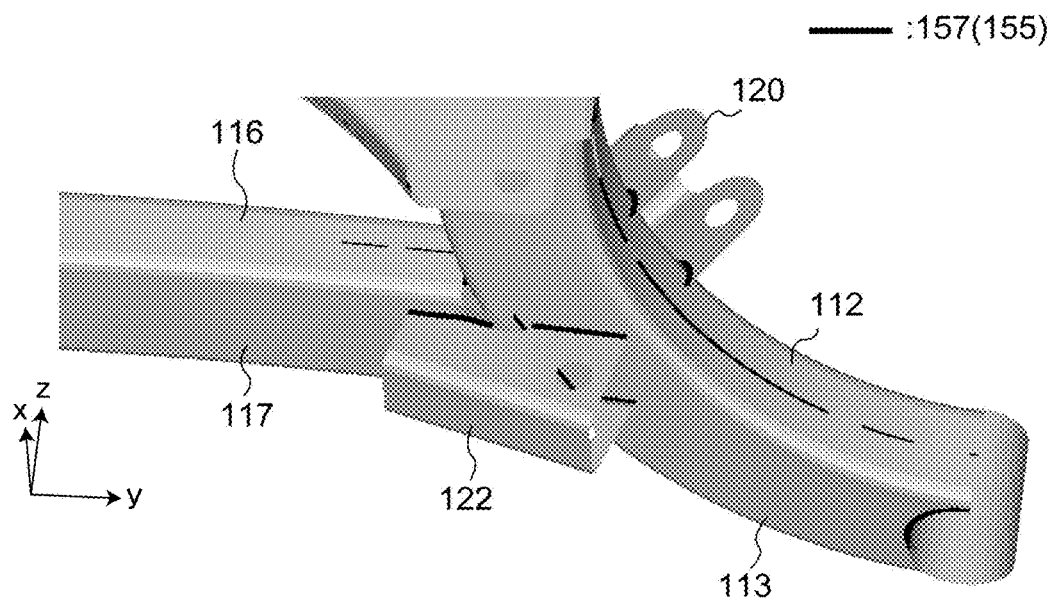
FIG. 15 illustrates the optimal arrangement of a weld line, which has been determined by optimization analysis in Comparative Example 1, in which the rear subframe model was set as an analysis target and an optimization analysis condition regarding stiffness and a joining length was set, in Example 1.

FIG. 10 illustrates a result of the candidate 155 for weld line, which has been left, in Invention Example 1 in the Example 1. FIG. 15 illustrates a result of the candidate 155 for weld line, which has been left, in Comparative Example 1. As illustrated in FIG. 10, weld lines were densely arranged around the brackets 120, 121, and 122. Joints between the subframe uppers 112 and 114 and the subframe lowers 113 and 115 and a joint between the cross member upper 116 and the cross member lower 117 were sparsely arranged. In contrast, as illustrated in FIG. 15, in Comparative Example 1, in particular, a joint between the cross member upper 116 and the cross member lower 117 and a joint between the subframe upper 112 and the subframe lower 113 are arranged more sparsely than in Invention Example 1.

Figure 16:
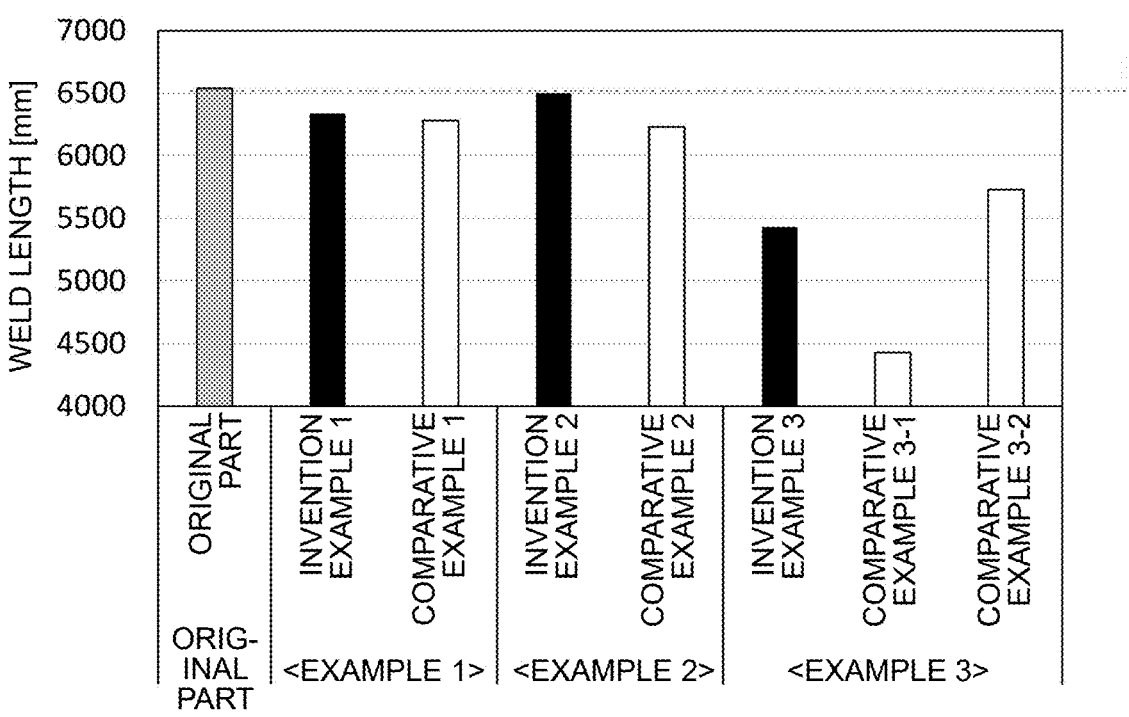
FIG. 16 is a graph illustrating a length of a weld line (weld length) determined by optimization analysis in Examples 1 to 3.

Table 2 illustrates analysis results of Examples 1 to 3, that is, weld lengths (lengths of weld lines) after optimization analysis. FIG. 16 graphically illustrates Table 2.

TABLE 2

| | | After optimization Weld length [mm] |
|---|---|---|
| | Original part | 6540 |
| <Example 1> | Invention Example 1 | 6340 |
| | Comparative Example 1 | 6280 |
| <Example 2> | Invention Example 2 | 6500 |
| | Comparative Example 2 | 6230 |
| <Example 3> | Invention Example 3 | 5430 |
| | Comparative Example 3-1 | 4430 |
| | Comparative Example 3-2 | 5730 |

Next, in order to perform performance evaluation using a weld line after optimization, the stiffness and the fatigue life of the weld line 157 were calculated for an optimal weld line rear subframe model 161 (see FIG. 10) in which the arrangement of the candidate 155 for weld line, which had been left by optimization analysis, was set as the optimal arrangement of the weld line 157.

In the calculation of the stiffness and the fatigue life, stress analysis was performed by giving the loading condition of the first vibration pattern and the loading condition of the second vibration pattern in FIG. 5 and the constraint condition to the optimal weld line rear subframe model 161.

Each of displacements of the stiffness evaluation point A (see FIG. 5) determined by stress analysis under each of the loading condition of the first vibration pattern and the loading condition of the second vibration pattern was used as an index of the stiffness of the optimal weld line rear subframe model 161.

The minimum fatigue life among fatigue lives calculated by using stress of the weld line 157 determined by stress analysis for the optimal weld line rear subframe model 161 was used as an index of the fatigue life of the weld line 157.

Figure 17:
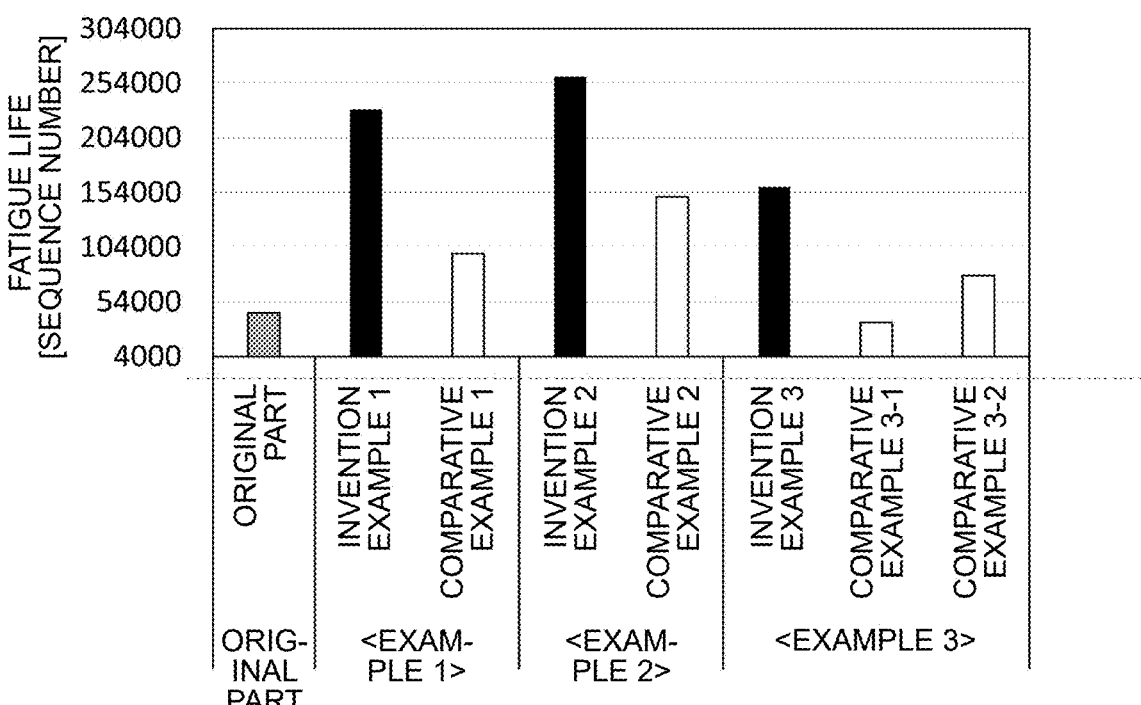
FIG. 17 is a graph illustrating the minimum fatigue life of a weld line in the rear subframe model, in which the optimal arrangement of the weld line was set, in Examples 1 to 3.
Figure 18:
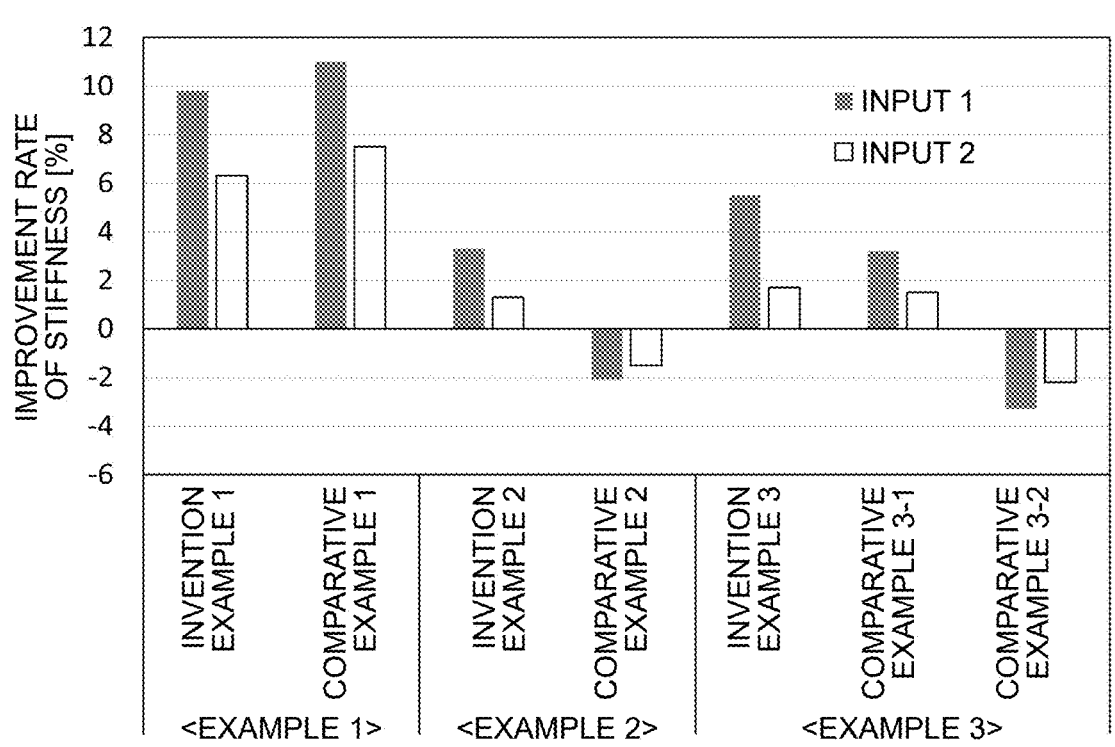
FIG. 18 is a graph illustrating an improvement rate of stiffness in the rear subframe model, in which the optimal arrangement of a weld line was set, in Examples 1 to 3.

Table 3 illustrates an evaluation result. FIGS. 17 and 18 graphically illustrates a fatigue life and an improvement rate of stiffness in Table 3. Table 3 also illustrates a weld length in Table 2.

TABLE 3

| | | After optimization Weld length [mm] | Performance evaluation result | | |
|---|---|---|---|---|---|
| | | | Fatigue life *1 [set] | Improvement rate of stiffness *2 [%] | |
| | | | | Input 1 | Input 2 |
| Original part | | 6540 | 44000 | Reference | Reference |
| <Example 1> | Invention Example 1 | 6340 | 230000 | 9.8 | 6.3 |
| | Comparative Example 1 | 6280 | 98000 | 11.0 | 7.5 |
| <Example 2> | Invention Example 2 | 6500 | 260000 | 3.3 | 1.3 |
| | Comparative Example 2 | 6230 | 150000 | −2.1 | −1.5 |
| <Example 3> | Invention Example 3 | 5430 | 159000 | 5.5 | 1.7 |
| | Comparative Example 3-1 | 4430 | 35000 | 3.2 | 1.5 |
| | Comparative Example 3-2 | 5730 | 78000 | −3.3 | −2.2 |

The improvement rates of stiffness in the Inputs 1 and 2 are determined by the following expression.

Improvement rate of stiffness of Input 1 [%] =

$$\left[ 1 - \frac{\begin{array}{l}\text{absolute value of displacement in rear (X)} \\ \text{direction of point } A \text{ in joining arrangement} \\ \text{after optimization in Input 1 (rear direction)}\end{array}}{\begin{array}{l}\text{absolute value of displacement in rear} \\ (X) \text{ direction of point } A \text{ in arrangement} \\ \text{of initial weld line in Input 1 (rear direction)}\end{array}} \right] \times 100$$

Improvement rate of stiffness of Input 2 [%] =

$$\left[ 1 - \frac{\begin{array}{l}\text{absolute value of displacement in outward} \\ (Y) \text{ direction of point } A \text{ in joining arrangement} \\ \text{after optimization in Input 2 (outward direction)}\end{array}}{\begin{array}{l}\text{absolute value of displacement in outward} \\ (X) \text{ direction of point } A \text{ in arrangement} \\ \text{of initial weld line in Input 2 (outward direction)}\end{array}} \right] \times 100$$

Improvement rate of stiffness of Input 1 [%] =

$$\left[ 1 - \frac{\begin{array}{l}\text{absolute value of displacement in rear (X)} \\ \text{direction of point } A \text{ in joining arrangement} \\ \text{after optimization in Input 1 (rear direction)}\end{array}}{\begin{array}{l}\text{absolute value of displacement in rear} \\ (X) \text{ direction of point } A \text{ in arrangement} \\ \text{of initial weld line in Input 1 (rear direction)}\end{array}} \right] \times 100$$

Improvement rate of stiffness of Input 2 [%] =

$$\left[ 1 - \frac{\begin{array}{l}\text{absolute value of displacement in outward} \\ (Y) \text{ direction of point } A \text{ in joining arrangement} \\ \text{after optimization in Input 2 (outward direction)}\end{array}}{\begin{array}{l}\text{absolute value of displacement in outward} \\ (Y) \text{ direction of point } A \text{ in arrangement} \\ \text{of initial weld line in Input 2 (outward direction)}\end{array}} \right] \times 100$$

In any of Invention Examples 1 to 3 and Comparative Examples 2 and 3-2, a fatigue life is set as an objective or a constraint, so that the fatigue life is improved as compared with that of an original part. Then, in all of Examples 1 to 3, the fatigue life is improved more significantly in the invention examples than in the comparative examples.

Furthermore, in any of Invention Examples 1 to 3 and Comparative Examples 1 and 3-1, stiffness is set as an objective or a constraint, so that the stiffness is improved as compared with that of the original part. Then, although the improvement rates of stiffness are substantially the same as each other in Invention Example 1 and Comparative Example 1 in Example 1, the improvement rates of stiffness are higher in the invention examples than in the comparative examples in all of Examples 2 and 3.

INDUSTRIAL APPLICABILITY

According to the present invention, it is possible to provide the automotive body joining position optimization analysis method, device and program for determining the optimal arrangement of a weld line, which minimizes the length of the weld line, while improving the stiffness of the automotive body and the fatigue life of a continuous weld line for bonding and joining a parts assembly in the automotive body in a case where a simple or variable load is input to the automotive body, as well as the automotive body manufacturing method.

REFERENCE SIGNS LIST

1 OPTIMIZATION ANALYSIS DEVICE
3 DISPLAY DEVICE
5 INPUT DEVICE
7 MEMORY STORAGE
9 WORKING DATA MEMORY
11 ARITHMETIC PROCESSING UNIT
13 ANALYSIS OBJECT MODEL SETTING UNIT
15 OPTIMIZATION ANALYSIS MODEL GENERAT-ING UNIT
17 VARIABLE AMPLITUDE LOAD CONDITION SET-TING UNIT
19 TARGET FATIGUE LIFE SETTING UNIT
21 OPTIMIZATION ANALYSIS CONDITION SET-TING UNIT
23 OPTIMIZATION ANALYSIS UNIT
31 OPTIMIZATION ANALYSIS DEVICE
33 ARITHMETIC PROCESSING UNIT
34 OPTIMIZATION ANALYSIS UNIT
35 SELECTED CANDIDATE-FOR-WELD-LINE SET-TING ANALYSIS OBJECT MODEL GENERATING UNIT
37 SELECTED CANDIDATE-FOR-WELD-LINE PER-FORMANCE CALCULATING UNIT
39 DETERMINATION UNIT
41 OPTIMAL WELD LINE DECIDING UNIT
100 TIRE INPUT POINT
101 AUTOMOTIVE BODY MODEL FILE
111 REAR SUBFRAME MODEL
112 SUBFRAME UPPER
113 SUBFRAME LOWER
114 SUBFRAME UPPER
115 SUBFRAME LOWER
116 CROSS MEMBER UPPER
117 CROSS MEMBER LOWER
118 CROSS MEMBER FRONT
119 CROSS MEMBER REAR
120, 121, 122 BRACKET
131 INITIAL WELD LINE
141 ELECTRIC ARC WELDING PORTION
151 OPTIMIZATION ANALYSIS MODEL
153 ADDITIONAL WELD LINE
155 CANDIDATE FOR WELD LINE
157 WELD LINE
161 OPTIMAL WELD LINE REAR SUBFRAME MODEL
201 AUTOMOTIVE BODY MODEL
203 SIDE SILL
211 SUBFRAME R
212 SUBFRAME L
213 CROSS MEMBER FRONT
214 REAR CROSS MEMBER

The invention claimed is:

1. An automotive body joining position optimization analysis method of performing optimization analysis for determining optimal arrangement of a weld line to achieve one of: improving stiffness of an automotive body model; improving a fatigue life near the weld line for bonding and joining a parts assembly in the automotive body model; and minimizing a length of the weld line for all or a part of the automotive body model having a plurality of part models including a beam element, a two-dimensional element, and/or a three-dimensional element and having an initial weld line for bonding and joining the plurality of part models as the parts assembly, the method being executed by a computer and comprising:

an analysis object model setting step of setting all or a part of the automotive body model as an analysis object model;

an optimization analysis model generating step of generating an optimization analysis model in which all candidates for weld line serving as candidates for weld lines in the optimal arrangement are set to the analysis object model;

a variable amplitude load condition setting step of setting a variable amplitude load condition in which a variable amplitude load to be given to the optimization analysis model is divided into loading conditions of a plurality of different vibration patterns and a predetermined cycle number of loading conditions of the vibration patterns are combined to form one sequence;

a target fatigue life setting step of setting a target fatigue life of the optimization analysis model by a number of sequences of the variable amplitude load condition;

an optimization analysis condition setting step of, in order to perform optimization analysis in which the optimization analysis model is set as a target of optimization, determining a number of cycles to fracture near each of the candidates for weld line for each of the loading conditions of the vibration patterns, determining a sum of ratios between the cycle number of the loading conditions of the vibration patterns and the number of cycles to fracture by the number of sequences of the variable amplitude load condition set by the target fatigue life setting unit as a liner cumulative damage of each of the candidates for weld line, and setting a condition regarding the liner cumulative damage of each of the candidates for weld line, which are to be left by optimization analysis, a condition regarding stiffness of the optimization analysis model, and a condition regarding a length of each of the candidates for weld line, which are to be left by optimization analysis, as an objective or a constraint, which is an optimization analysis condition; and an optimization analysis step of giving the variable amplitude load condition set by the variable amplitude load condition setting unit to the optimization analysis model, performing optimization analysis under the optimization analysis condition, and determining arrangement of each of the candidates for weld line as optimal arrangement of the weld line to achieve one of: reducing the liner cumulative damage of each of the candidates for weld line; improving stiffness of the optimization analysis model; and minimizing a length of each of the candidates for weld line, which are to be left.

2. The automotive body joining position optimization analysis method according to claim 1, wherein the optimization analysis step includes performing topology optimization based on densimetry, and performing discretization by setting a penalty coefficient to four or more in the topology optimization.

3. An automotive body manufacturing method, in which a weld line for bonding and joining a parts assembly in an automotive body is optimally arranged and stiffness of the automotive body and a fatigue life of the weld line are improved, the method comprising:

determining optimal arrangement of the weld line by using the automotive body joining position optimization analysis method according to claim 1;

deciding a joining position of the parts assembly in the automotive body based on the optimal arrangement of the weld line that has been determined; and bonding and joining the parts assembly of the automotive body at the joining position that has been decided.

4. The automotive body manufacturing method according to claim 3, wherein the optimization analysis step includes performing topology optimization based on densimetry, and performing discretization by setting a penalty coefficient to four or more in the topology optimization.

\*    \*    \*    \*    \*